US011573665B2

(12) United States Patent
Yip et al.

(10) Patent No.: US 11,573,665 B2
(45) Date of Patent: Feb. 7, 2023

(54) BEAMFORMING OPTIMIZATION FOR SEGMENTED THIN-FILM ACOUSTIC IMAGING SYSTEMS INCORPORATED IN PERSONAL PORTABLE ELECTRONIC DEVICES

(71) Applicant: Apple Inc., Cupertino, CA (US)

(72) Inventors: Marcus C. Yip, San Carlos, CA (US); Brian M. King, Saratoga, CA (US); Jason S. Griesbach, Sausalito, CA (US); Ehsan Khajeh, Los Gatos, CA (US); Aaron S. Tucker, Redwood City, CA (US); Andrew W. Joyce, San Jose, CA (US); Giovanni Gozzini, Berkeley, CA (US); Mohammad Yeke Yazdandoost, San Francisco, CA (US); Gordon S. Franza, Rockledge, FL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/709,251

(22) Filed: Mar. 30, 2022

(65) Prior Publication Data
US 2022/0317805 A1  Oct. 6, 2022

Related U.S. Application Data

(60) Provisional application No. 63/169,040, filed on Mar. 31, 2021.

(51) Int. Cl.
*G06F 3/043* (2006.01)
*G06F 3/041* (2006.01)

(52) U.S. Cl.
CPC ........ *G06F 3/0436* (2013.01); *G06F 3/04166* (2019.05)

(58) Field of Classification Search
CPC .......................... G06F 3/0436; G06F 3/04166
See application file for complete search history.

(56) References Cited

U.S. PATENT DOCUMENTS

| | | | |
|---|---|---|---|
| 9,218,811 B2 | 12/2015 | Alameh | |
| 9,431,015 B2 | 8/2016 | Alameh | |
| 9,530,381 B1 | 12/2016 | Bozarth | |
| 9,589,170 B2 | 3/2017 | Ling | |
| 9,819,849 B1 | 11/2017 | Rivard | |
| 10,452,937 B2 | 10/2019 | Jin et al. | |
| 10,469,714 B2 | 11/2019 | Rivard | |
| 10,579,847 B2 | 3/2020 | Cho et al. | |
| 10,725,595 B2 | 7/2020 | Schooley | |
| 10,824,837 B2 | 11/2020 | Yeke Yazdandoost et al. | |

(Continued)

*Primary Examiner* — Amit Chatly
(74) *Attorney, Agent, or Firm* — Brownstein Hyatt Farber Schreck, LLP

(57) ABSTRACT

An acoustic imaging system coupled to an acoustic medium to define an imaging surface. The acoustic imaging system includes an array of piezoelectric acoustic transducers formed at least in part from a thin-film piezoelectric material, such as PVDF. The array is coupled to the acoustic medium opposite the imaging surface and formed using a thin-film manufacturing process over an application-specific integrated circuit that, in turn, is configured to leverage on or more beamforming scan operations to drive the array of piezoelectric actuators to generate an image of an object at least partially wetting to the imaging surface.

20 Claims, 19 Drawing Sheets

(56) References Cited

U.S. PATENT DOCUMENTS

| | | |
|---|---|---|
| 11,092,998 B1 * | 8/2021 | Castañeda ............... G06F 1/163 |
| 11,270,096 B2 | 3/2022 | Yeke Yazdandoost et al. |
| 2017/0330012 A1 * | 11/2017 | Salvia .................. G06F 1/3231 |
| 2020/0074133 A1 * | 3/2020 | Cheng ................. G06Q 20/326 |
| 2020/0319734 A1 | 10/2020 | Schooley |
| 2021/0019018 A1 * | 1/2021 | Guo ...................... G06F 3/0436 |
| 2021/0019487 A1 * | 1/2021 | Chau ................. G06V 40/1306 |
| 2021/0397801 A1 * | 12/2021 | Arellano ............. G10K 11/346 |
| 2022/0198820 A1 | 6/2022 | Yeke Yazdandoost et al. |
| 2022/0237940 A1 * | 7/2022 | Bouzari ................ G06V 10/25 |

* cited by examiner

BEAMFORMING OPTIMIZATION FOR SEGMENTED THIN-FILM ACOUSTIC IMAGING SYSTEMS INCORPORATED IN PERSONAL PORTABLE ELECTRONIC DEVICES

CROSS-REFERENCE TO RELATED APPLICATION

This application is a nonprovisional of, and claims the benefit under 35 U.S.C. 119(e) of, U.S. Provisional Patent Application No. 63/169,040, filed Mar. 31, 2021, the contents of which are incorporated herein by reference as if fully disclosed herein.

TECHNICAL FIELD

Embodiments described herein relate to digital imaging systems and, in particular, to acoustic imaging systems and methods for operating the same configured for use through an exterior surface having an arbitrary profile (e.g., curved, planar, and so on) of a portable electronic device, such as a display surface or a housing surface of a handheld, personal electronic device.

BACKGROUND

An acoustic imaging system can be used to capture an image of an object at least partially wetting to a surface, often referred to as an "imaging surface." Certain conventional acoustic imaging systems are implemented with a two-dimensional array of microelectromechanical piezoelectric actuators that (1) generate an acoustic pulse directed toward the imaging surface in response to stimulus from control electronics and/or (2) output an electrical signal upon receiving reflections of those acoustic pulses resulting from impedance mismatch boundaries defined by contours of the object wetting to the imaging surface.

In many cases, however, conventional imaging systems are not suitable to operate with nonplanar imaging surfaces, such as curved sidewall surfaces of a button, a housing, or a rotary input device.

SUMMARY

Embodiments described herein relate to signal processing chains for thin-film acoustic imaging systems leveraged by portable electronic devices for biometric imaging. Specifically, a portable electronic device can include an imaging system, as described herein. The imaging system can be coupled to (and/or can partially define) a surface of a housing of the portable electronic device.

For embodiments described herein, the surface may be a flat/planar surface, such as a display surface, or may be a curved surface such as a sidewall surface. In many examples, embodiments described herein are configured to leverage adaptive beamforming techniques to (1) improve contrast uniformity across an imaging surface and (2) to improve overall signal to noise ratios by automatically reducing carrier noise via destructive interference.

This architecture and arrangement defines an imaging area that, if touched by a user, exhibits a pattern of acoustic impedance mismatch that corresponds to that user's fingerprint. More generally, any object that contacts the imaging area causes a pattern of acoustic impedance mismatch that corresponds to surface features of an exterior surface of that object that are in contact with (e.g., wetting to) the imaging area. In some examples, subsurface acoustic impedance mismatch patterns may also be introduced.

For certain embodiments described herein, a thin-film acoustic imaging system can include an array of imaging tiles, each tile including an array of independently-addressable thin-film acoustic transducers. In some examples, although not required, each transducer or at least one of the transducers is formed from polyvinylidene fluoride (PVDF) disposed over a semiconductor circuit (e.g., in a spin coating operation).

Each of the independently-addressable thin-film acoustic transducers can be conductively coupled to one or more drive control electronics (which can be defined in whole or in part in the semiconductor circuit). The drive control electronics can be configured to apply a high-frequency signal (e.g., 10 MHz-20 MHz) to at least one of the independently-addressable thin-film acoustic transducers to cause that thin-film acoustic transducer to generate an acoustic pulse that propagates through at least a portion of the housing of the portable electronic device toward the imaging area. In many embodiments, multiple transducers can be driven in a particular sequence and/or with specific phase shifts and/or amplitude variations so as to beamsteer and/or beamform acoustic energy in a particular direction in order to constructively or destructively interfere at a particular point or set of points. In many cases, a beamforming operation may be spatially optimized in order to reduce carrier noise at a transducer, or set of transducers, configured to receive reflections resulting from the beamforming operation.

Reflections from the imaging area thereafter return to the array of independently-addressable thin-film acoustic transducers which may generate an electrical signal corresponding to a magnitude of acoustic energy received at least respective transducer. As may be appreciated by a person of skill in the art, the magnitude of acoustic energy received at each transducer may be a function of the acoustic impedance mismatch pattern introduced by an object, such as a finger, engaging/touching the imaging area.

To receive and process these reflections (e.g., in order to reconstruct or otherwise resolve an image of the external surface of the object engaging the imaging area), the imaging system includes signal processing and/or conditioning pipeline and an analog-to-digital converter.

More specifically, each tile of the array of imaging tiles is associated with a dedicated analog front end responsible for preprocessing and/or conditioning signals received from each thin-film acoustic transducer of that tile. Each dedicated analog front end, of each tile of the array of tiles, is coupled to a shared analog to digital converter. As a result of this architecture, a single high-resolution analog to digital converter (e.g., a successive approximation analog to digital converter) can be used to convert output signals from each independently-addressable thin-film acoustic transducer into a digital value suitable for generating an image of an object in direct or indirect contact with the thin-film acoustic imaging system.

In many embodiments, each analog front end of each tile of the array of imaging tiles includes a carrier rejection biasing element configured to bias an output of at least one thin-film acoustic transducer in a manner that reduces carrier noise in the output signal. In other cases, a low pass filter or other envelope-based detection/filtering mechanism can be used.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
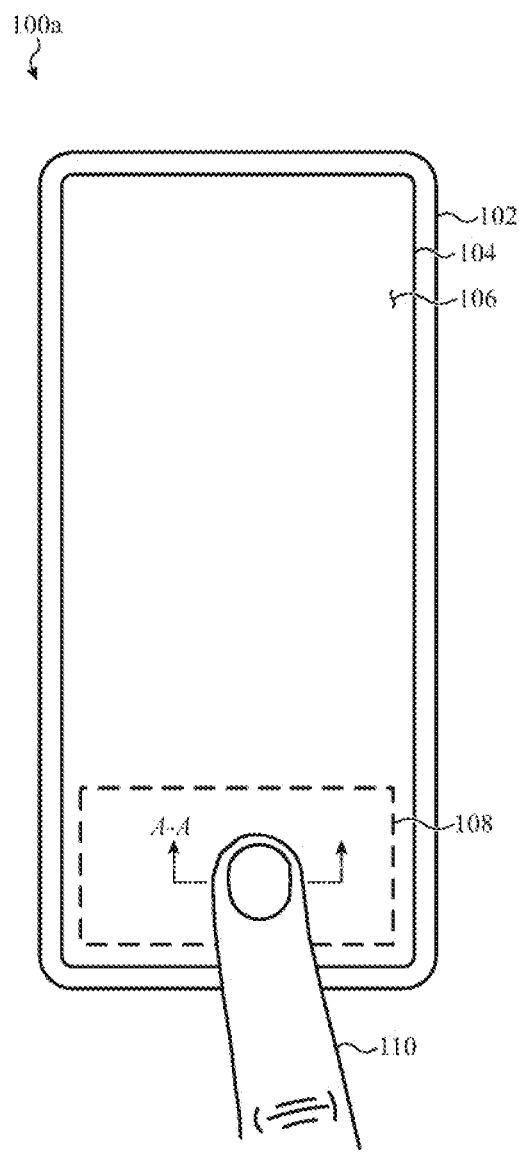
FIG. 1A depicts an example electronic device incorporating a thin-film acoustic imaging system defining an imaging surface above an active display area of the electronic device, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by, or may be presented to, represent one or more propagating waves of mechanical energy (herein, "acoustic energy") originating from one or more acoustic transducers or other mechanical energy sources shown or, in some cases, omitted from, the accompanying figures. It is understood that these simplified visual representations of acoustic energy are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract acoustic energy at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to acoustic imaging systems and, in particular, to acoustic imaging systems incorporated into electronic devices leveraged to capture images of fingerprints of users of those electronic devices.

In particular, embodiments described herein reference methods operating an acoustic imaging system that includes an array of acoustic transducers (which may be thin-film acoustic transducers), as described herein, that leverage beamforming and/or beamsteering techniques to condition or concentrate acoustic energy output from each of a first set of acoustic transducers of the array of acoustic transducers toward a selected fractional area of an imaging surface defined by the acoustic imaging system.

More specifically, embodiments described herein reference systems and methods for driving multiple acoustic transducers with differently-phased signals and/or at different times (e.g., with different delay) so that acoustic energy output from two or more acoustic transducers constructively or destructively interfere at a particular location of an imaging surface or at a particular location after having reflected from the imaging surface. For example, in some embodiments, beamforming may be used to reduce carrier noise at sense-mode transducers; in such examples, delay coefficients that define delays and/or phase relationships between different drive-mode transducers may not be optimized to concentrate acoustic energy at the imaging surface but, rather, may be optimized to reduce carrier amplitude observed by sense-mode transducers that receive acoustic energy having been reflected from the imaging surface at least once.

More generally, for embodiments described herein, beamforming may be leveraged to improve image contrast and/or increase signal to noise ratio(s). In such examples, selected drive-mode transducers can be operated according to implementation-specific delays/phases in order to effect a particular increase or decrease of acoustic energy at a particular location, which may be at an imaging surface or, in other cases, at one or more selected sense-mode transducers.

Embodiments described herein can be further configured for higher-order control of beamforming operations. For example, a particular or selected beamforming operation can be executed to obtain a digital or analog value corresponding to an acoustic impedance mismatch at a particular fractional area of an imaging surface. By interactively or progressively changing which fractional area (e.g., in rows or columns) of an imaging surface is the target of the beamforming operation, a two-dimensional image of an object wetting to the imaging surface can be constructed. For example, if a user is touching the imaging surface with a finger, an image of the user's fingerprint can be generated leveraging the systems and methods described herein.

For example, in one embodiment, an imaging surface can be subdivided into 1024 fractional segments, arranged in 16 rows of 64. In this example, an acoustic imaging system can leverage a beamforming operation to target one fractional area at a time, progressively building an image of an object engaging the surface, the image being 16×64 pixels in resolution.

In another examples, an imaging surface can be logically subdivided into 66,560 fractional segments, arranged in 64 rows of 1024. In this example, an acoustic imaging system can leverage a beamforming operation to target one fractional area at a time, progressively building an image of an object engaging the imaging surface, the image being 64×1024 pixels in resolution.

These foregoing examples are not limiting; any suitable number of fractional subdivisions of an imaging surface can be defined by a system as described herein.

Similarly, it may be appreciated that a manner in which an acoustic imaging system advances from one selected fractional area of the imaging surface to another fractional area of the imaging surface can vary from embodiment to embodiment. For example, in some cases, fractional areas can be sampled row-wise, column-wise, randomly, in a checker-board pattern, in a serpentine pattern, in a concentric pattern, and so on. In some cases, a single fractional area may be imaged using two or more different beamforming operations. In such cases, individual measurements or imaging results can be averaged and/or combined in another suitable way. It may be appreciated that these examples are not exhaustive; any suitable technique for scanning and/or rasterizing an image of the imaging surface may be used.

As such, for simplicity of description, many embodiments described herein reference a plan scanner configured to select or otherwise determine a scan plan. A scan plan can be associated with a particular pattern of advancing between fractional areas of an imaging surface. In addition, a scan plan can be configured to associated particular fractional areas with particular beamforming operations. For example, in some cases, fractional areas of an imaging surface nearby an edge or perimeter of the imaging surface may be imaged by leveraging a first beamforming operation or combination of a set of beamforming operations which may be different from a second beamforming operation or second combination of beamforming operations leveraged to image a fractional area of the imaging surface within a center of the imaging surface.

More particularly, a scan plan as described herein can also define how a particular beamforming operation should be carried out given a particular targeted fractional area of the imaging surface. For example, as noted above, for any given beamforming operation, different drive-mode transducers may be driven at different times, at different phases, and/or with different drive signals altogether. As such, a scan plan can include a set of delay coefficients and/or other operation-defining parameters or attributes that configure a set of drive-mode transducers to provide output in a particular way corresponding to the desired beamforming operation. As a result of these and related constructions, a scan planner can be configured to select a scan plan and execute that scan plan which, in turn, causes a process to initiate that sequentially executes particularly-configured beamforming operations each uniquely configured to target a particular fractional area of the imaging surface. Sense-mode transducers capture reflections resulting from each of these beamforming operations and, based on output from the sense-mode transducers, an image of an object engaging the imaging surface can be generated at higher resolution and higher contrast than conventional imaging techniques.

Broadly, an acoustic imaging system as described herein can include a scan planner that is configured to, in response to an instruction to generate an image of an object engaging an imaging surface, select and/or determine a scan plan that, in turn, leverages one or more beamforming techniques to image each among a set of fractional areas of the imaging surface. Example scan plans include, but are not limited to: row-wise advancement between fractional areas of the imaging surface; column-wise advancement between fractional areas of the imaging surface; serpentine advancement between fractional areas of the imaging surface; arbitrary patterns of advancement between fractional areas of the imaging surface; random selection of fractional areas of the imaging surface; arbitrarily-sized region-by-region advancement between fractional areas of the imaging surface; and so on. Beamforming operations leveraged while executing these or other scan plans can include: operations in which different frames of delay profiles and/or delay coefficients are provided to the same set of drive-mode transducers, thereby causing a focal point of acoustic energy to change frame-by-frame to different fractional areas of the imaging surface; operations in which the same delay profiles are provided in sequence to different sets of drive-mode transducers, thereby causing a focal point of acoustic energy to change frame-by-frame to different fractional areas of the imaging surface; operations in which different frames of delay profiles and/or delay coefficients are provided to the different sets of drive-mode transducers, thereby causing a focal point of acoustic energy to remain directed to the same fractional area of the imaging surface; operations in which different frames of delay profiles and/or delay coefficients are provided to the different sets of drive-mode transducers, thereby causing a focal point of acoustic energy to change depth relative to the imaging surface but remain directed to the same fractional area of the imaging surface; and so on. In many cases, as noted above, a single fractional area of the imaging surface may be imaged multiple times, in many cases, so that different beamforming operations can be performed to the same fractional area. In these examples, different measurements can be averaged or combined (or sorted, selected from) in any suitable way.

More generally, it may be appreciated that an acoustic imaging system as described herein can be readily adapted for incorporation in any number of suitable structures. For example, the beamforming and scan planning operations described above can enable an acoustic imaging system as described herein to capture an image through curved surface, such as a curved sidewall surface of an electronic device housing.

Similarly, an acoustic imaging system as described herein can be configured to capture an image through any suitable material, including metals, ceramics, and glass. In many embodiments, an acoustic imaging system may be leveraged by an electronic device to capture an image of a fingerprint of a user of that electronic device, but this is not required of all embodiments and other purposes may be suitable.

In many implementations, an acoustic imaging system, such as described herein, is positioned behind a display of an electronic device to facilitate through-display imaging of a user's fingerprint when that user touches the display. In other implementations, an acoustic imaging system, such as described herein, can be positioned relative to a housing of a hand-held electronic device to facilitate through-housing imaging of a user's fingerprint when that user handles the hand-held electronic device, such as by grasping a sidewall surface of the housing.

In yet other implementations, an acoustic imaging system, such as described herein, can be positioned relative to a physical input device, such as a button (e.g., a power button) or crown, or key (e.g., of a keyboard), to facilitate imaging of a user's fingerprint when that user interacts with the physical input device. In still other examples, an acoustic imaging system, such as described herein, can be incorporated into any suitable location of any suitable electronic device and leveraged for any suitable imaging purpose, whether biometric or otherwise. These preceding examples are not exhaustive.

For example, an imaging system can be used for input sensing and/or session management. For example, a fingerprint my be recognized as having moved over time (e.g., which may be interpreted as an input) and/or a fingerprint or surface contact image (e.g., from a hand, glove, wrist, and so on) may be recognized as having recently changed by at least a threshold amount, indicating that a user of the electronic device has changed. In this example, active sessions (e.g., web sessions) may be invalidated. Many examples and use cases for an imaging system as described herein are possible.

For simplicity of description, embodiments described herein reference an acoustic imaging system including a two-dimensional array of piezoelectric actuators that may be coupled to an "acoustic medium." In many examples, an acoustic medium as described herein, may be a portion of a housing of an electronic device. In other cases, the acoustic medium may be a liquid or gas, such as air.

In some examples, an acoustic medium defined through an electronic device housing can exhibit a generally rectangular cross-sectional profile defined by two substantially parallel opposing surfaces, such as an interior surface of the housing and an exterior surface of the housing. In other cases, an acoustic medium defined through an electronic device housing can exhibit a curved cross-sectional profile defined by a planar surface opposite a curved surface, such as a planar interior surface of the housing and a curved exterior surface of the housing. Many implementations are possible.

In many examples, a two-dimensional array of piezoelectric actuators is adhered, via a thin layer of impedance-matching adhesive (e.g., micrometer scale, for example 1-5 µm) to one acoustic medium surface, thereby defining an opposite surface surface as an "imaging surface." For example, if a thin-film piezoelectric actuator is coupled to an interior surface of an electronic device housing, a portion of the exterior surface of that electronic device housing opposite the thin-film piezoelectric actuator defines the imaging surface. In this example, the material of the housing (e.g., metal, plastic, glass, ceramic, and so on) defines the acoustic medium.

As may be appreciated by a person of skill in the art, a piezoelectric actuator can be manufactured in a number of suitable ways. In some conventional systems, a piezoelectric actuator can be formed in a microelectromechanical machining process that defines a vacuum cavity backing a sheet of piezoelectric material. If a voltage is applied across the piezoelectric material, the material can compress or expand in a direction, thereby generating a pulse of mechanical energy that can propagate through any acoustic medium to which the actuator is coupled.

However, manufacturing a microelectromechanical piezoelectric actuator is a multistage process that is expensive, time consuming, and subject to substantial error. For example, in many cases, forming vacuum cavities suitable for a large array of acoustic transducers requires a process that is incompatible with CMOS processes necessary to define one or more circuits or traces. As a result, different manufacturing steps are required which, in turn, requires at least one alignment step during manufacturing. As may be appreciated by a person of skill in the art, alignment operations during manufacturing increase rejection rates and necessitate high tolerance for error, which informs and impacts overall design.

To account for these and other issues with conventional acoustic imaging systems, embodiments described herein leverage thin-film layers that exhibit piezoelectric properties to define arrays of acoustic transducers. Such layers can be formed over existing integrated circuits, which in turn means that transducer layers can be formed in a single contiguous process with CMOS layers, eliminating any need for repositioning or realignment.

In addition, as a result of the thin-film architecture(s) described herein, a requirement for a backing layer (such as a vacuum cavity, required of conventional microelectromechanical piezoelectric actuators) is eliminated and, thus, acoustic impedance of a two-dimensional array of piezoelectric actuators can be increased relative to conventional microelectromechanical designs. As a result of increased acoustic impedance of the thin-film piezoelectric actuators, an acoustic imaging system such as described herein can be closer to impedance matched to materials with high acoustic impedance, such as glass or metal, substantially more effectively than conventional acoustic imaging designs.

In a more general, non-limiting, phrasing, an acoustic imaging system such as described herein can be used to capture images of objects wetting to imaging surfaces defined by high-impedance materials, exhibiting increased power efficiency and increased signal-to-noise ratio. As a result, an acoustic imaging system such as described herein can be leveraged by, as one example, a portable electronic device to capture an image of a user's fingerprint through glass and/or metal, such as may be used to form a housing of the electronic device.

As a result of these described constructions, one or more of the thin-film piezoelectric actuators can generate an acoustic pulse toward the imaging surface through a body or bulk of the acoustic medium. As the propagating acoustic pulse reaches the imaging surface, which defines an acoustic boundary, a portion of the acoustic pulse may reflect back towards the array and a portion of the acoustic pulse may traverse the acoustic boundary and propagate into another acoustic medium interfacing the imaging surface (e.g., air, an object wetting to the imaging surface, and so on). This boundary is an acoustic impedance mismatch boundary.

The acoustic imaging system, in these and other related examples, can quantify properties of said reflections by sampling voltages output from one or more thin-film piezoelectric transducers of the two-dimensional array.

In particular, output voltage samples over time may correspond to amplitude of the reflections, which, in turn, can be correlated to the acoustic impedance of the object (and, in particular, the acoustic impedance mismatch between the acoustic medium and the object) wetting to the imaging surface. For example, in the case of a user's fingerprint touching the imaging surface, ridges of the user's fingerprint introduce a different acoustic impedance mismatch than the acoustic impedance mismatch introduced by air enclosed by a valley of the user's fingerprint.

As a result of this arrangement, the acoustic imaging system can be leveraged to generate an image of acoustic impedance mismatches defined by contours of an object at least partially wetted to the imaging surface.

For example, the acoustic imaging system may drive individual thin-file piezoelectric transducers to generate acoustic pulses (e.g., by driving the transducers with a wavelet or other electrical signal, such as current or a voltage signal) and receive reflections resulting therefrom in a sequence or pattern (e.g., row by row, column by column, transducer by transducer, serpentine pattern, and so on).

In other cases, multiple transducers can be driven or stimulated by control electronics according to a specific timing pattern (e.g., beamforming) such that multiple acoustic pulses generated by multiple transducers constructively interfere at a target location of the imaging surface. These preceding examples are not exhaustive; it may be appreciated that a two-dimensional array of piezoelectric transducers such as described herein can be leveraged in a number of suitable ways to generate an image, such as described herein.

Further to the foregoing, a thin-film piezoelectric transducer array, such as described herein, can be formed directly atop, over, or an application-specific integrated circuit ("integrated circuit") configured to stimulate selected piezoelectric transducers of the array with a voltage to cause each stimulated piezoelectric transducer to expand along an axis parallel to an electric field within that transducer induced by the stimulus voltage.

This operation is referred to herein as "driving" a piezoelectric transducer configured in an "integration mode." In addition, an application-specific integrated circuit is configured to receive and sample, from selected piezoelectric transducers of the array, an output voltage resulting from compression or expansion of that respective piezoelectric transducer. This operation is referred to herein as "sensing" with a piezoelectric transducer configured in a "sense mode."

Similarly, it is appreciated that an acoustic medium, such as described herein, may in some embodiments form a part of an electronic device display or housing. In such examples, the imaging surface can be any suitable external surface of an electronic device, such as an external surface above a display or an external surface of a housing sidewall.

As a result of this construction, the application-specific integrated circuit can initiate a drive operation with one or more piezoelectric transducers configured in an integration mode to generate one or more acoustic waves.

In further examples, specific signal processing pipelines are described that can improve signal to noise ratios when operating in a sense mode. In particular, in many embodiments, an array of thin-film piezoelectric actuators can be subdivided and/or segmented into segments also referred to as "tiles." Each tile can include dedicated readout circuitry, referred to herein as an "analog front end." Each analog front end of each tile can be configured to perform one or more signal conditioning and/or noise reduction operations such as filtering operations (e.g., bandpass, high-pass, low-pass, or other frequency-domain filtering operations), integration operations, amplification operations, attenuation operations, and so on.

Thereafter, outputs from each of the respective analog front ends can be readout by a shared final stage (or stages) that optionally filters additionally and/or converts analog signals to digital values. As a result of this architecture, a single high-quality analog to digital converter with high resolution can be leveraged to convert analog signals from each individual acoustic transducer of the array of acoustic transducers. Similarly, signal conditioning operations can be performed with higher-quality and higher-fidelity circuits and electronics at the tile level. In these embodiments, benefits associated with including high quality components can be balanced against the cost of providing high quality signal processing and conditioning pipelines for all or substantially all transducers of an array. In addition, the tiled/segmented architecture described herein can be leveraged for parallel processing; while one tile is performing integration and/or sensing operations, other tiles can be performing the same or different integration and/or sensing operations. In such cases, analog values output from one or more of the tiles can be stored in temporary storage (e.g., capacitors) until the shared final stage is available to convert such values into digital values suitable for digital-domain digital operations such as image construction, contrast correction, template matching, de-noising, de-skewing, and so on.

These foregoing and other embodiments are discussed below with reference to FIGS. 1A-10. However, those skilled in the art will readily appreciate that the detailed description given herein with respect to these figures is for explanation only and should not be construed as limiting.

Figure 1B:
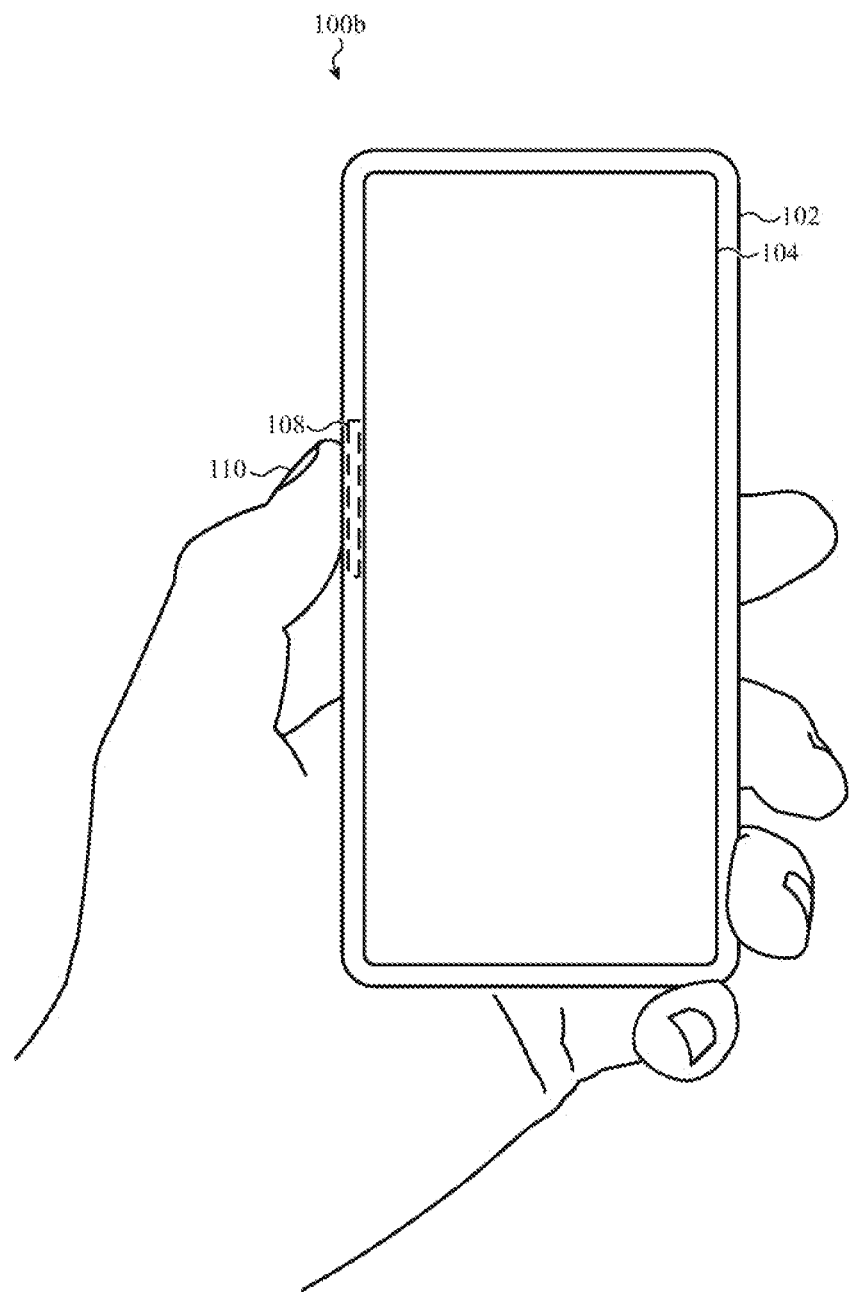
FIG. 1B depicts an example electronic device incorporating a thin-film acoustic imaging system defining an imaging surface along a housing sidewall of the electronic device, such as described herein.
Figure 1C:
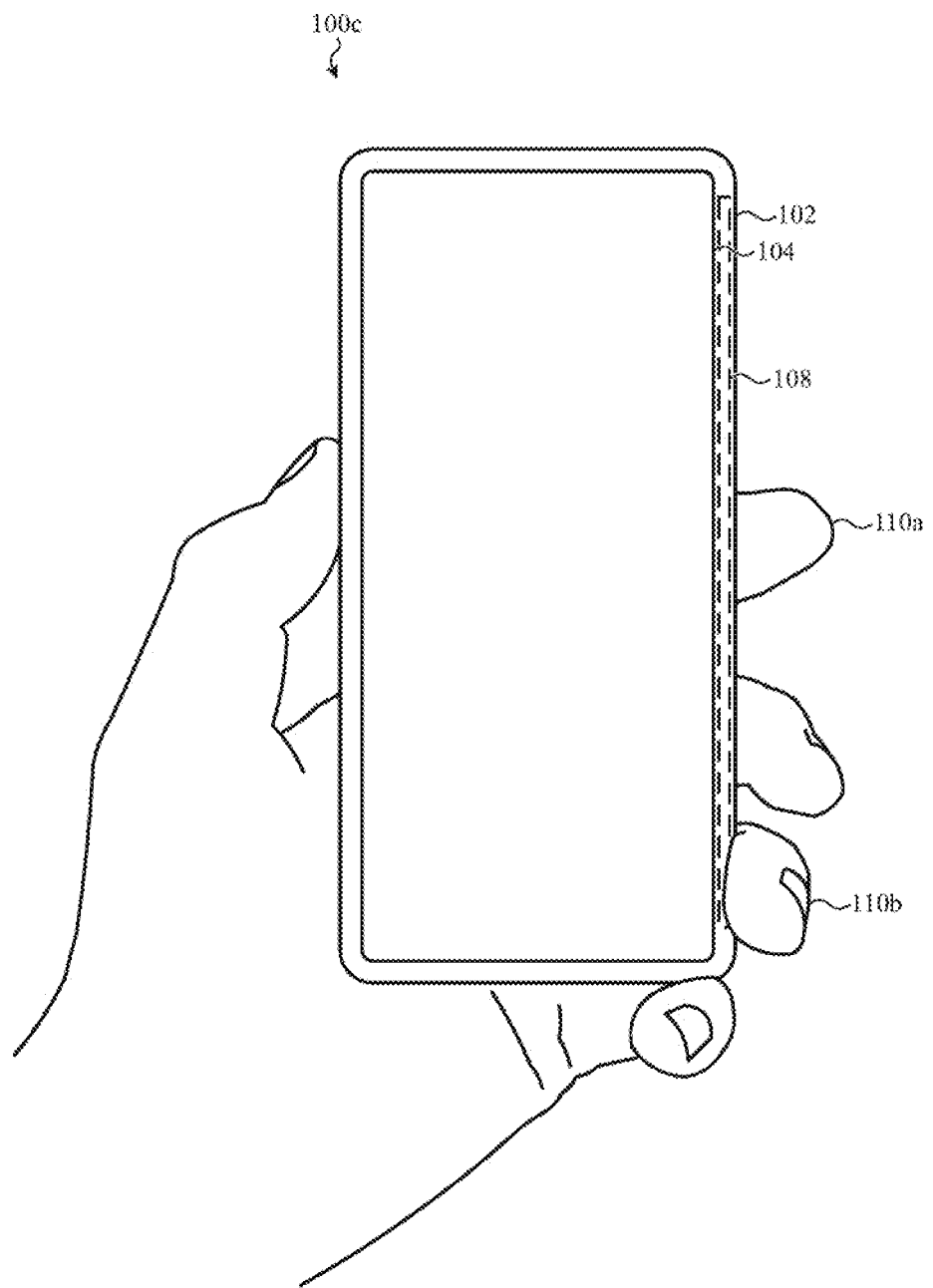
FIG. 1C depicts an example electronic device incorporating a thin-film acoustic imaging system defining an imaging surface along another housing sidewall of the electronic device, such as described herein.

Generally and broadly, FIGS. 1A-1C depict example electronic devices that can incorporate an acoustic imaging system such as described herein. In particular, as noted above, embodiments described herein relate to acoustic imaging systems that resolve an image of an object engaging an imaging surface (also referred to as an input surface) of an electronic device by generating acoustic pulses (one or more; in some examples constructively interfering via beamforming and/or phased array excitation techniques) with piezoelectric acoustic transducers.

The acoustic pulses propagate through a portion of the housing of the electronic device (more generally referred to herein as the "acoustic medium") toward the imaging surface and, thereafter, the acoustic imaging system samples voltage signals produced by the same or different piezoelectric acoustic transducers to quantify reflections of the acoustic pulses from the imaging surface.

As may be appreciated by a person of skill in the art, amplitudes of reflections from the imaging surface correspond to acoustic impedance mismatch boundaries at the imaging surface; some objects wetting to the imaging surface may absorb more acoustic pulse energy (e.g., objects having an acoustic impedance close to that of the acoustic medium) than other objects wetting to the imaging surface (i.e., objects having an acoustic impedance substantively different from that of the acoustic medium).

By iteratively generating acoustic pulses at any suitable waveform or carrier frequency and characterizing reflections resulting therefrom, an acoustic imaging system, such as described herein, can be leveraged to generate a two-dimensional image (or in further examples a three-dimensional image) the contrast of which corresponds to acoustic impedance mismatch boundaries/contours of one or more objects wetting to the imaging surface.

In one particular example, an acoustic imaging system may be used to generate an image of a fingerprint wetting to an imaging surface. Portions of that fingerprint that directly wet to the imaging surface (e.g., ridges) may reflect a different quantity of acoustic energy than portions of that fingerprint that do not wet to the imaging surface (e.g., valleys).

As such, different acoustic impedance mismatches are associated with ridges and valleys of a user's fingerprint and, by mapping acoustic impedance mismatch at different locations of the imaging surface, a two-dimensional image of the user's fingerprint can be generated which, in turn, can be computer readable and may be leveraged by the electronic device to perform a particular function, such as authentication or identification or a particular user.

For simplicity of description, many embodiments described herein are configured to operate as (or with) a biometric sensor that obtains and analyzes an image of a user's fingerprint when the user touches a display of an electronic device with one or more fingers. It is appreciated, however, that although many embodiments are described herein with reference to obtaining an image of a user's fingerprint, the various systems and methods described herein can be used to perform other operations, or to obtain non-fingerprint information, such as, but not limited to: obtaining an image of a palm; obtaining an image of an ear or cheek; determining the location of a stylus on an imaging surface of an electronic device; determining a physiological characteristic of a user such as heart rate or blood oxygenation; determining characteristics of a non-imaging surface; determining the force with which a user touches an imaging surface; determining the location at which a user touches an imaging surface; determining a user touch or force input to an imaging surface; and so on.

Accordingly, it may be appreciated that the various systems and methods presented below are merely examples and that other embodiments, systems, methods, techniques, apparatuses, and combinations thereof are contemplated in view of the disclosure provided below.

As used herein, the term "image" and the phrase "resolved image" refers to a collection of pixels, the coordinates of which correspond to local surface characteristics of an acoustic medium (or a portion thereof) that may change as a result of a user's fingertip when the fingertip makes physical contact with the acoustic medium at that location.

The area over which a user's fingertip contacts the acoustic medium can be referred to herein as the "contact area."

Typically, the acoustic medium defines an imaging surface of an electronic device such as, but not limited to: a touch-sensitive surface; a touch-sensitive display; a force-sensitive surface; a force-sensitive display; a cover glass of a display; an exterior surface of a housing or enclosure such as a protective outer layer; a sidewall surface of an electronic device; a button surface of an electronic device; a curved sidewall of an electronic device; a side or endcap surface of a rotary input device; and so on. In these embodiments, the contact area typically takes the shape of a pad of a user's fingertip (e.g., an ellipse).

In many embodiments, each pixel of a resolved image corresponds to an attenuation experienced by a reflection of an acoustic pulse propagating to, and reflecting from, that respective pixel location. The amount of attenuation (e.g., an "attenuation coefficient") at a particular location corresponds to a value (e.g., darkness, lightness, color, brightness, saturation, hue, and so on) of the associated pixel of the resolved image.

For example, the attenuation coefficient may be a number from 0 to 1.0, and the corresponding pixel may include a brightness value from 0 to 255 units. In this example, the attenuation coefficient and the brightness of the corresponding pixel value may be linearly related, although such a relationship is not necessarily required of all embodiments.

The resolution of the resolved image (and thus the number and/or distribution of pixels forming the same) can be based, at least in part, on the expected or average size of various features of the user's fingerprint. In one example, the resolution of the resolved image is greater than 120 pixels per centimeter (approximately 300 pixels per inch). In further examples, the resolution of the resolved image is greater than or equal to 200 pixels per centimeter (approximately 500 pixels per inch). In still further examples, other resolutions may be suitable. In some cases, the resolution of the resolved image may be non-uniform; certain areas of the resolved image may have a higher resolution than other areas.

As may be appreciated, and as noted above, an attenuation coefficient associated with a particular location of the acoustic medium (e.g., a "local attenuation coefficient") changes when a fingertip (or more particularly, a "feature" of a fingertip such as a ridge or a valley) is in physical contact with, or otherwise "wets" to, the acoustic medium (e.g., metal, plastic, glass, and so on) at that specific location. This is due to an acoustic impedance mismatch introduced by the wetting of the fingertip (or feature) to the acoustic medium at that location.

As noted above, the term "wetting" and related terminology refers to the spreading and/or partial compression of an object (often a solid object such as a finger), or the outermost surface of the same, when the object physically contacts or touches a surface. For example, a fingertip wets to the surface of the acoustic medium when the user presses the fingertip against the acoustic medium, causing the ridges of the fingerprint to compress and spread by a certain amount, thereby displacing substantially all air between the ridges of the fingerprint and the surface of the acoustic medium, For example, as noted above, a feature of a fingertip in direct physical contact with the acoustic medium at a particular location (e.g., a ridge of a fingerprint) attenuates an acoustic pulse propagated toward it, thereby affecting the value of the associated pixel of the resulting image.

Conversely, a feature that does not wet to the surface of the acoustic medium (e.g., a valley of a fingerprint) may not substantially attenuate acoustic pulses propagated therethrough, similarly not affecting the value of the associated pixel of the resulting image.

In this manner, the value of each pixel of the resolved image corresponds to whether or not a feature of a fingertip is wetted to the acoustic medium at that pixel location. More specifically, the pixels of the resolved image correspond to whether a ridge or a valley of a user's fingerprint is present at that pixel location. In this manner, the resolved image may serve as a direct proxy for an image of the user's fingerprint.

Furthermore, different features of a fingertip may introduce different acoustic impedance mismatches, thus resulting in different local attenuation coefficients and different pixel values in the resolved image.

For example, denser features of the fingertip (e.g., scar tissue) wetted to the acoustic medium may change local attenuation coefficient(s) differently than less dense features wetted to the surface of the acoustic medium. In other cases, the force with which the user touches the acoustic medium may affect local attenuation coefficients by compressing the fingertip against the acoustic medium. In this manner, the resolved image may exhibit contrast corresponding to the relative density of features of the fingertip wetted to the acoustic medium.

Accordingly, generally and broadly, an acoustic imaging system such as described herein is configured to resolve an image of a user's fingerprint by resolving an image of the acoustic attenuation effects provided by various features of the fingertip that make physical contact with the acoustic medium at various location. Such an image may be referred to herein as an "acoustic attenuation map" of an acoustic medium or contact area.

In some embodiments, an acoustic attenuation map can be modeled as a matrix, a vector, or as a function, the inputs of which are coordinates that correspond to locations on the acoustic medium. It may be appreciated that an acoustic imaging system such as described herein can obtain, resolve, or estimate an acoustic attenuation map of an acoustic medium (or contact area of the acoustic medium) using any suitable or implementation-specific method or combination of methods, several of which are described in detail below.

FIG. 1A depicts an electronic device 100a incorporating a thin-film acoustic imaging system defining an imaging surface above an active display area of the electronic device, such as described herein.

As depicted, an electronic device 100a can be implemented as a portable electronic device such as a cellular phone, although such an implementation is not required and other embodiments may be implemented as, without limitation: input devices; laptop computers; desktop computers; industrial processing interfaces; home automation devices; industrial security devices; navigation devices; peripheral input devices; and so on.

As may be appreciated, for simplicity of illustration, the electronic device 100a is depicted without many elements and functional components that may be leveraged by the electronic device to perform various operations, including operations related to an acoustic imaging system, such as described herein. For example, although not depicted, it may be appreciated that the electronic device 100a can include one or more processors, one or more memory elements, one or more data stores, one or more input components or sensors, and so on.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

In many embodiments, the processor can be operably coupled to a working memory and/or a long term memory. In these examples, a memory of the electronic device 100a can be configured to store at least one executable asset that, when accessed from the memory by the processor (and/or loaded into the working memory by the processor) can instantiate an instance of software configured to leverage and/or integrate with an acoustic imaging system as described herein. Such instances of software can be configured for any suitable purpose.

The electronic device 100a also includes a housing 102 and a display 104 defining an active display area 106. The display 104 is disposed below a protective outer layer to protect the display 104 from damage. In this manner, the protective outer layer above the display forms a portion of the housing 102, defining an exterior surface thereof. In many cases, the protective outer layer can be formed from an optically transparent and mechanically rigid material such as glass, sapphire, polycarbonate, and so on.

In many embodiments, the protective outer layer protecting the display 104 can be manufactured, at least in part, from a material exhibiting a high acoustic impedance, such as glass, crystalline materials, or transparent ceramic. In this context, "high" acoustic impedance refers to materials having an acoustic impedance greater than air and/or greater than organic material, such as a user's finger.

In many embodiments, an acoustic imaging system 108 can be disposed within the housing 102 of the electronic device 100a. As with other embodiments described herein, the acoustic imaging system 108 can include an array of acoustic transducers that are configured to generate acoustic pulses and to receive reflections (e.g., echoes) thereof.

For example, in some embodiments, the acoustic imaging system 108 can be coupled to (e.g., adhered) an internal surface the protective outer layer of the display 104. As a result of this construction, the acoustic imaging system 108 can be leveraged to resolve an image of an object, such as the pad of a fingertip (e.g., fingerprint) of a user 110, in physical contact with the protective outer layer. More particularly, the acoustic imaging system 108 can be configured to determine an acoustic attenuation map of an imaging surface defined as a portion of an exterior surface of the protective outer layer of the display 104.

In some cases, the acoustic imaging system 108 is configured to generate and/or estimate an acoustic attenuation map of only a portion of the protective outer layer of the display 104. This may increase the speed with which the acoustic attenuation map may be generated and/or estimated by reducing the number of calculations and/or operations required. In the illustrated embodiment, the portion of the protective outer layer is identified with a dotted line enclosing a rectangular area. In other examples, other area shapes are possible.

Once an image of fingerprint (or other biometrically-unique surface characteristics such as handprints, ear prints, and so on) of the user 110 is imaged by the acoustic imaging system 108, the obtained image can be compared to a database of known images to determine if the obtained image, and/or features or information derived therefrom (e.g., vector maps, hash values, and so on), matches a known image.

If an affirmative match (e.g., a match exceeding or otherwise satisfying a threshold) is obtained, the electronic device 100a can perform a function related to the match. In one example, the electronic device 100a performs a privacy-sensitive authenticated function, such as displaying financial information on the display 104.

In other embodiments, an acoustic imaging system, such as the acoustic imaging system 108 may be disposed relative to other portions of the housing 102 of the electronic device 100a, so as to defined imaging surfaces elsewhere than shown in FIG. 1A. For example, FIG. 1B depicts an example configuration in which an acoustic imaging system 108 can be positioned relative to a sidewall of the electronic device 100b, such that a fingerprint image of a user 110 can be captured while the user 110 grasps the phone.

In another example depicted in FIG. 1C, an acoustic imaging system 108, such as described herein, can be disposed along a sidewall of a housing 102 of the electronic device 100c. In contrast to FIG. 1B, in FIG. 1C, the acoustic imaging system 108 can extend for substantially an entirely length of a sidewall of the housing 102 of the electronic device 100c. As a result of this construction, multiple fingerprint images can be captured simultaneously, such as the user's fingerprint 110a and the user's fingerprint 110b.

These foregoing embodiments depicted in FIGS. 1A-1C and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that any number of acoustic imaging systems can be included in an electronic device, such as described herein. Such systems can be associated with any internal or external surface of an electronic device; some constructions may position an acoustic imaging system adjacent to a sidewall surface of an electronic device, whereas others may position an acoustic imaging system below or relative to an active display area of a display.

It is appreciated that any suitable number of configurations and constructions are possible in view of the description provided herein.

For example, FIGS. 1D-1I depict an example set of embodiments in which an acoustic imaging system, such as described herein, can be incorporated into various portions of a wearable electronic device such as a smart watch secured to a wrist of a user by a band. As noted above, this is merely one example of an electronic device or, more generally, one example of a wearable electronic device, and it may be appreciated that other constructions and architectures are possible in view of the embodiments described herein.

Figure 2A:
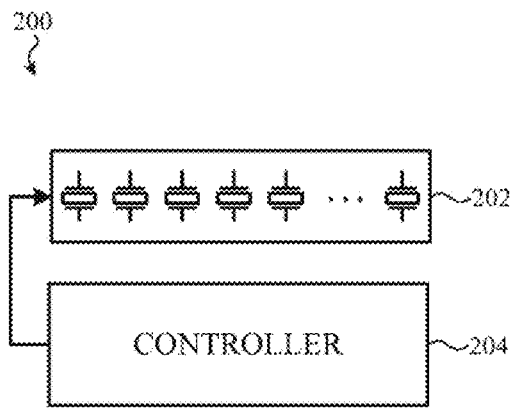
FIG. 2A depicts an example simplified system diagram of a thin-film acoustic imaging system including a rectilinear distribution of piezoelectric transducers, such as described herein.
Figure 2B:
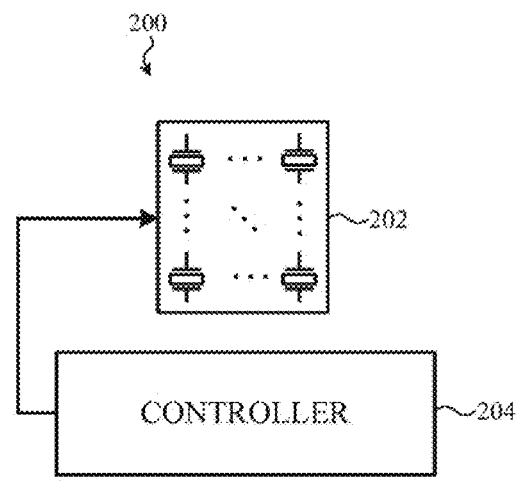
FIG. 2B depicts an example simplified system diagram of a thin-film acoustic imaging system including a grid distribution of piezoelectric transducers, such as described herein.
Figure 2C:
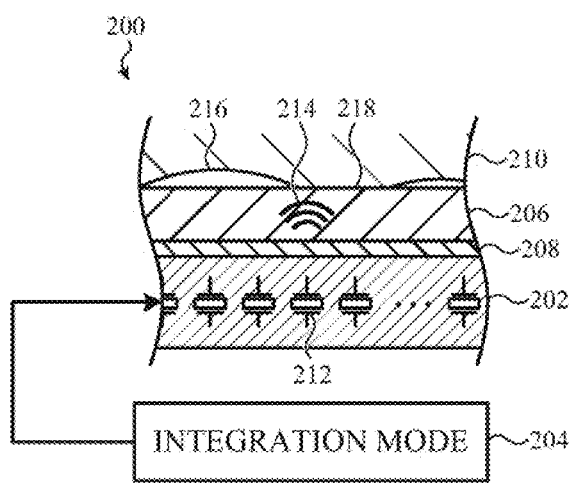
FIG. 2C depicts an example simplified system diagram of the thin-film acoustic imaging system of FIG. 1A, taken through section A-A, depicting an acoustic wave propagating toward a user's finger wetting to an imaging surface.
Figure 2D:
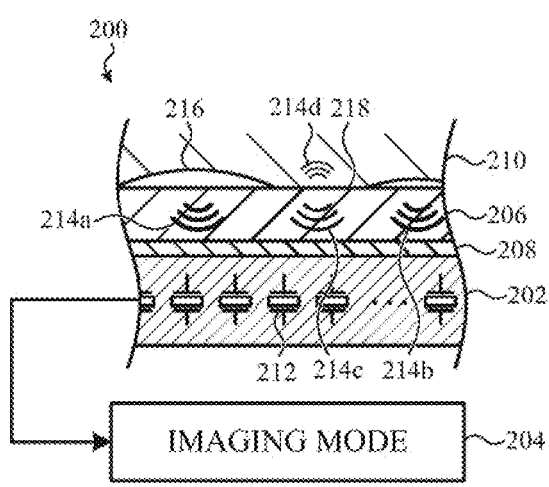
FIG. 2D depicts the simplified system diagram of FIG. 2C, depicting a set of acoustic wave reflections propagating from impedance mismatch boundaries defined by contours of the user's fingerprint.

For example, FIG. 2D depicts a wearable electronic device 100d that includes a housing 112 enclosing and supporting operational and functional components of the wearable electronic device 100d. The housing 112 can be formed from any suitable material including plastics, metals, ceramics, glass, and so on. The housing 112 can be rigid or flexible and may be monolithic or formed from multiple discrete sections, layers, or portions of material—which may be the same material or differing materials—and may take any suitable shape. The housing 112 can have rounded or flat sidewalls.

The housing 112 can be secured to a limb of a wearer, such as a wrist, by a band 114. The band 114 can be flexible or rigid and can be formed from any suitable material or combination of materials. The band 114 can be formed from, and/or defined by, a single piece of material or multiple interlocking or interwoven pieces of material. The band 114 can be configured to stretch, flex, and/or bend around or contour to a user's wrist in any suitable manner.

The housing 112 can enclose a display that can be used to render a graphical user interface within an active display area 116 configured to emit light through at least a portion of the housing 112. In some examples, a display defining the active display area 116 can be positioned below a cover glass that defines at least a portion of an exterior surface of the housing 112.

As with other embodiments described herein, the wearable electronic device 100d can incorporate acoustic imaging system that may be configured in the same manner as described above with respect to FIGS. 1A-1C.

Figure 1D:
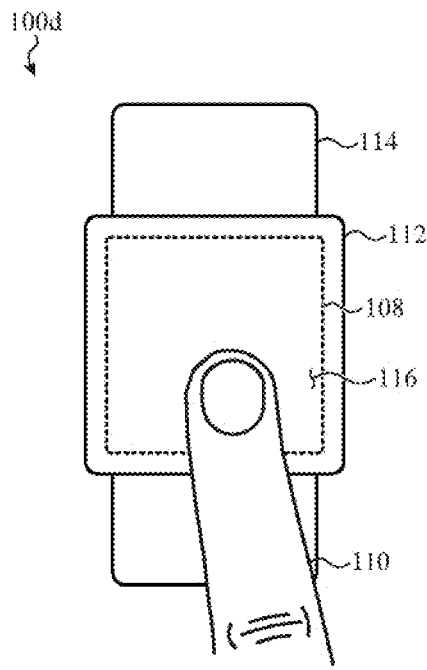
FIGS. 1D-1I depict an example wearable electronic device incorporating a thin-film acoustic imaging system, such as described herein.

In FIG. 1D, the acoustic imaging system is identified as the acoustic imaging system 108. In this illustration, the acoustic imaging system 108 is disposed relative to the active display area 116 such that when a user 110 interacts with content rendered in the graphical user interface shown by the active display area 116 of the display of the wearable electronic device 100d, the acoustic imaging system 108 can operate to detect and/or image a fingerprint of the user 110.

Figure 1E:
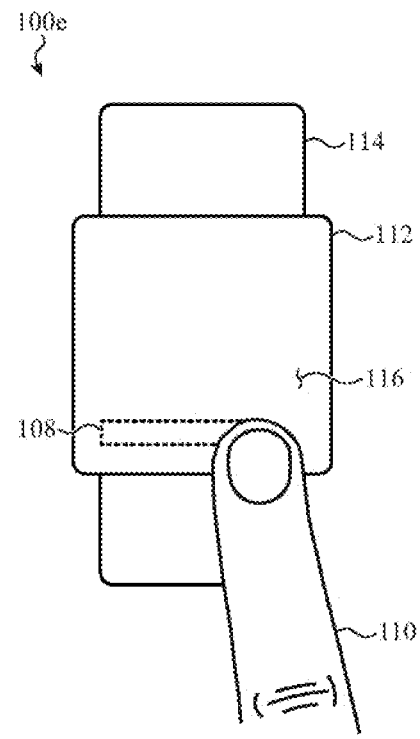

The depicted configuration is merely one example; the acoustic imaging system 108 can be disposed in any suitable portion of a wearable electronic device such as described herein. For example, FIG. 1E depicts a configuration in which a wearable electronic device 100e includes the acoustic imaging system 108 across only a portion of the active display area 116 of the wearable electronic device 100e.

Figure 1F:
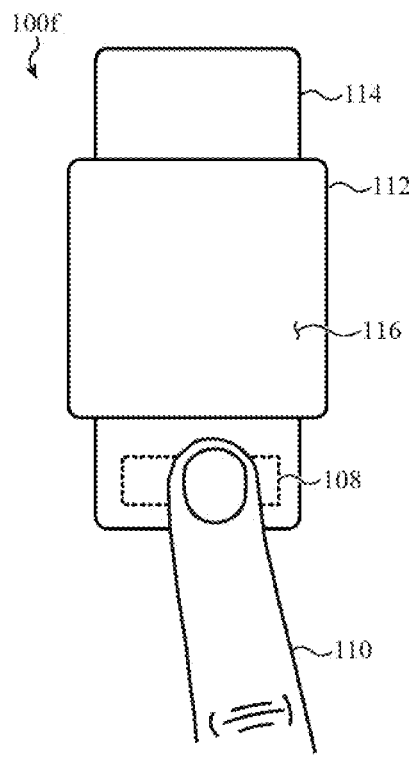

In other cases, an acoustic imaging system 108 can be included in at least a portion of the band 114, such as shown in FIG. 1F. In this embodiment, a user 110 that touches an exterior surface of the band 114 can engage the acoustic imaging system 108 which, in response, can generate an image of the user's fingerprint. In yet other examples, the acoustic imaging system 108 can be configured to image a surface of the wrist of the user 110.

In other words, in some configurations, the acoustic imaging system 108 can be oriented to direct acoustic imaging functionality toward the user's wrist. In some examples of these configurations, the acoustic imaging system 108 can be configured to detect and/or identify one or more skin characteristics of the epidermis of the wearer (e.g., the user 110). In other examples of these configurations, the acoustic imaging system 108 can be configured to image subdermal layers of the user's wrist, for either biometric imaging purposed or biometric data collection purposes. For example, in some examples, an acoustic imaging system 108 as described herein that is incorporated into a band 114 and/or a housing of a wearable electronic device such as the wearable electronic devices 100d, 100e, or 100f can be configured to generate an acoustic image of an interior of the user's wrist, such as an image of an artery, a vein pattern, a musculature image, a skeletal image, and so on. Such images, and/or combinations thereof, can be leveraged by the wearable electronic device for authentication purposes and/or biometric data collection purposes.

Figure 1G:
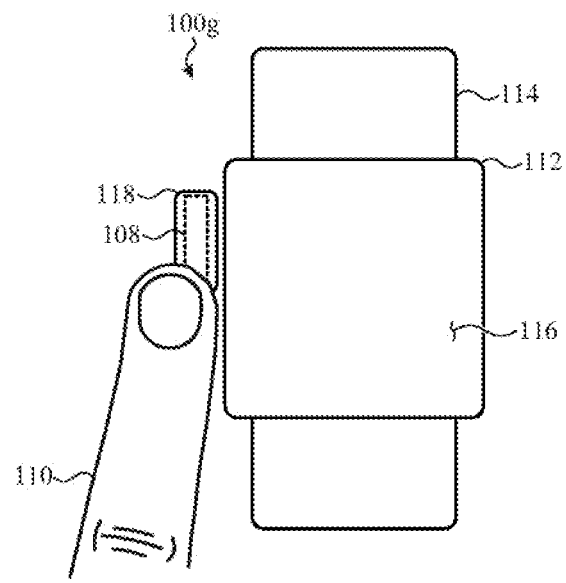

In yet other embodiments the acoustic imaging system 108 can be incorporated into an exterior surface a rotating input device extending from and/or integrated with the housing 112. For example, as shown in FIG. 1G, a crown 118 can incorporate the acoustic imaging system 108 such that as a user 110 moves his or her finger across the crown to provide a rotating input to the wearable electronic device 100g, the acoustic imaging system 108 can become in contact with a progressively different portion of the user's fingerprint, thereby progressively building a fingerprint image and/or at least a portion thereof.

Figure 1H:
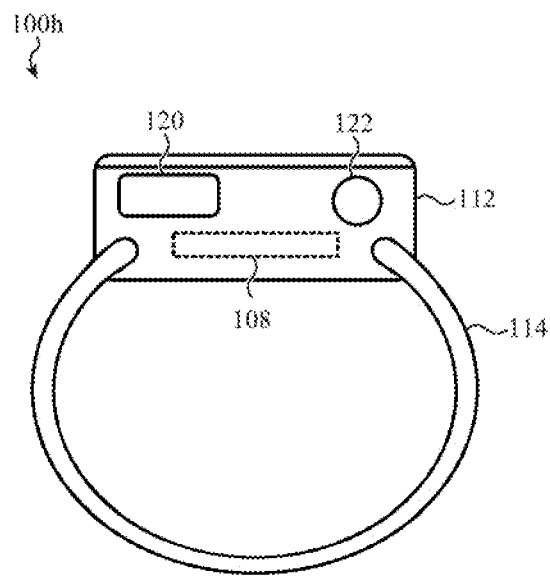

In yet further examples, the acoustic imaging system 108 can be incorporated into a sidewall surface of the housing 112. For example, FIG. 1H depicts the acoustic imaging system 108 positioned relative to a lateral sidewall of the housing 112, through which physical input controls may likewise extend. For example, as shown in FIG. 1G, a button 120 and/or a rotary input device 122 can be included.

Each of these controls may be configured to move and/or rotate in response to an application of pressure or friction by a user, such as the user 110. A degree to which either control moves may be received by the wearable electronic device as an input. For example, the wearable electronic device 100g can receive a degree of rotation of the rotary input device 122 as a scrolling input and may receive a press of the button 120 as a selection input. These foregoing examples are not exhaustive; any suitable input device whether physical or virtual can be included in a wearable electronic device as described herein.

In the illustrated example, the acoustic imaging system 108 is configured to provide acoustic imaging functionality through a sidewall portion of the electronic device that is separate from other physical or virtual controls (e.g., buttons, rotary input devices, and so on) defined through that sidewall; this is merely one example configuration.

Figure 1I:
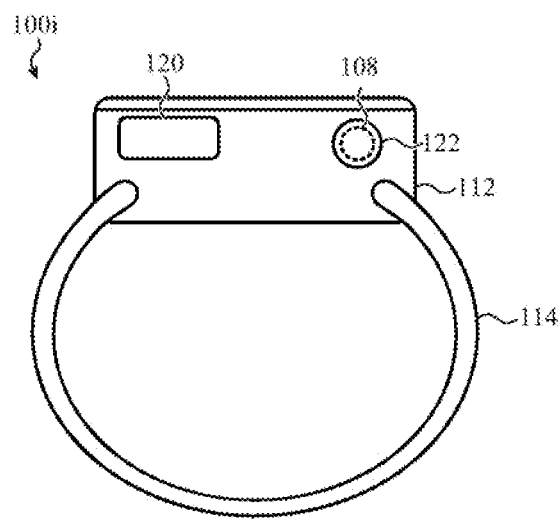

For example, in other embodiments, an acoustic imaging system such as the acoustic imaging system 108 can be included within a physical control of the wearable electronic device. For example, as shown in FIG. 1I, the acoustic imaging system 108 can be included within the rotary input device 122. In the illustrated embodiment, the acoustic imaging system 108 is disposed to provide acoustic imaging functionality from a circular surface area of the rotary input device 122, but this is also merely one example construction. In some examples, the acoustic imaging system 108 can be included within and/or disposed around a circumference of the rotary input device 122; in this construction, as a user rotates the rotary input device 122, a different portion of that user's finger is in contact with the rotary input device 122, thereby enabling the acoustic imaging system 108 to image a different portion of that user's fingerprint.

These foregoing embodiments depicted in FIGS. 1D-1I and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it may be appreciated that an acoustic imaging system can take any shape (e.g., rectilinear shapes, circular shapes, square shapes, polygonal shapes, and so on) and can be incorporated into any suitable electronic device or surface or input component thereof. Further, it may be appreciated that a single electronic device can include multiple different and/or discrete acoustic imaging systems. For example, in some embodiments, a first imaging system may be disposed within a button or rotary input device and a second acoustic imaging system may be disposed behind (and/or otherwise relative to) a display of the same wearable, portable, or stationary electronic device.

Figure 2E:
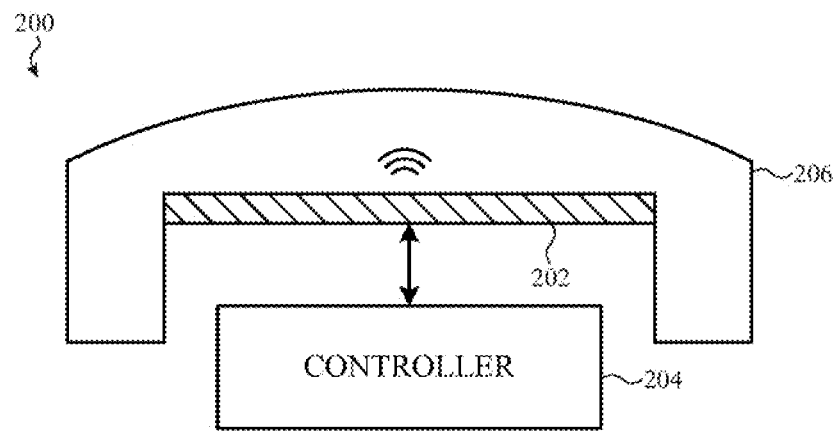
FIG. 2E depicts an example simplified system diagram of a thin-film acoustic imaging system positioned below, and configured to operate with, a convex imaging surface, such as described herein.
Figure 2F:
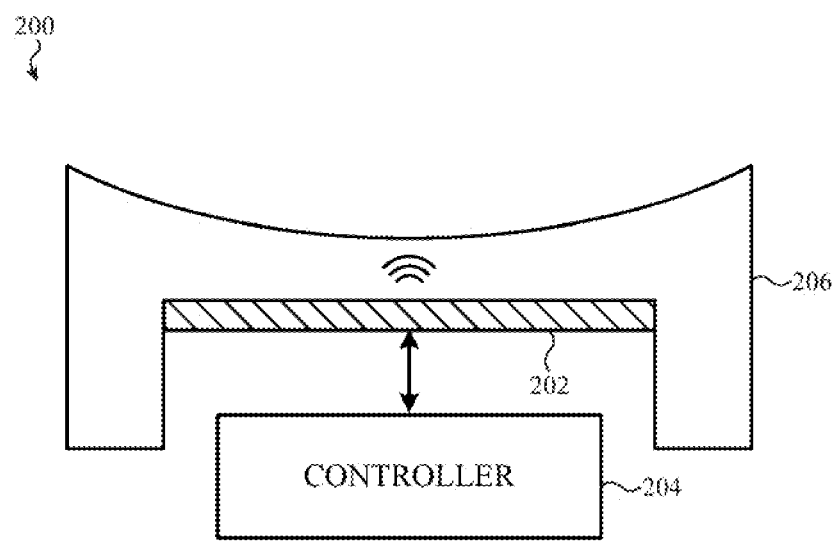
FIG. 2F depicts an example simplified system diagram of a thin-film acoustic imaging system positioned below, and configured to operate with, a concave imaging surface, such as described herein.
Figure 3:
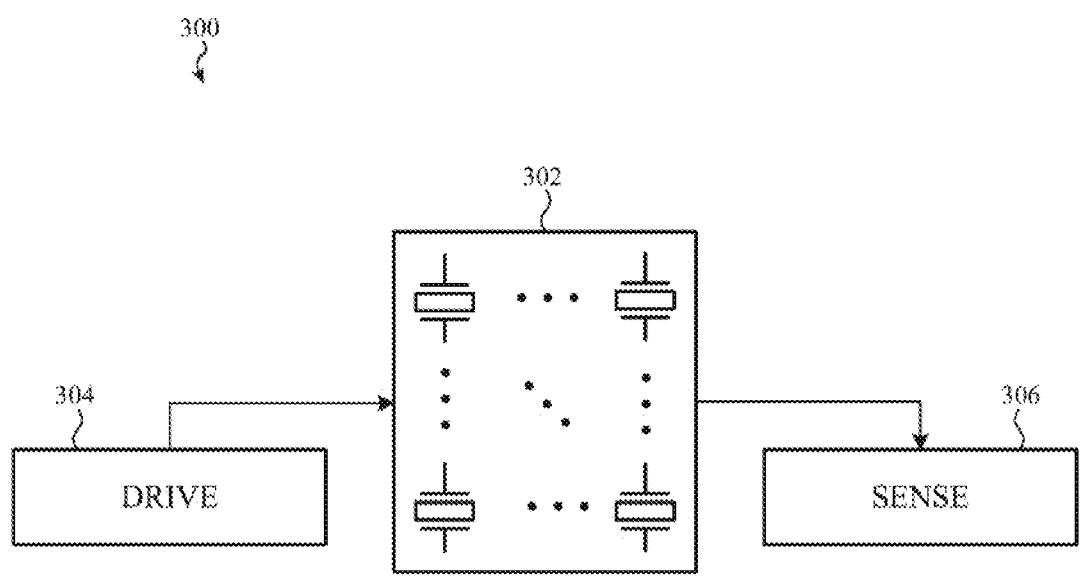
FIG. 3 depicts an example simplified system diagram of a thin-film acoustic imaging system, such as described herein.

Generally and broadly, FIGS. 2A-3 depict simplified system diagrams of an acoustic imaging system, such as described herein. Independent of whether the acoustic imaging system of these embodiments is constructed using d31 or d33 piezoelectric transducers, it may be appreciated that the piezoelectric transducers can be coupled to and/or otherwise formed on an application-specific integrated circuit, which in turn may be formed in a reel-to-reel or single-stage thin-film transistor manufacturing process.

As a result of this configuration, an acoustic imaging system such as described herein can be manufactured without a requirement for alignment of an array of microelectromechanical piezoelectric transducers with signal traces, solder pads, or other electrical or mechanical coupling(s). As such, an acoustic imaging system, such as described herein, can be manufactured at a more rapid pace and/or can be coupled to an acoustic medium (such as an electronic device housing as shown in FIGS. 1A-1C) to define an imaging surface in a number of suitable ways, several of which are described below.

Further, it may be appreciated that the following (and foregoing) embodiments may be coupled to an acoustic medium with any suitable adhesive or mechanical fastener or fastening methodology (including friction fit, insert molding and the like). In many embodiments, as may be appreciated by a person of skill in the art, an adhesive and/or mechanical fastener used to couple an acoustic imaging system, such as described herein, to a surface of an acoustic medium (e.g., display, housing, sidewall, and so on) can be selected at least in part based on an acoustic impedance of that material (when cured, cooled, or otherwise in a final manufacturing state).

More specifically, in many embodiments adhesives to couple an acoustic imaging system to an acoustic medium may be selected and/or deposited and/or cured so as to provide an acoustic impedance transition from an acoustic imaging system (and, in particular, an array of piezoelectric transducers of an acoustic imaging system) to the acoustic medium.

In this manner, a person of skill in the art will appreciate, that the acoustic imaging system can be more effectively matched to the acoustic medium and, as a result, can more efficiently operate to obtain an image of an object wetting to the imaging surface, such as a fingerprint wetting to an external surface of an electronic device housing.

For example, and as noted above, embodiments described herein relate generally to methods and systems for operating acoustic imaging systems, such as those integrated into the electronic device(s) depicted in FIGS. 1A-1C. Many acoustic imaging systems described herein can be generalized to a simplified architecture including an acoustic medium (e.g., a substrate; typically a monolithic substrate) with two parallel surfaces such as a top surface and a bottom surface.

For convention herein, the bottom surface is understood to be coupled to (e.g., adhered to or otherwise in mechanical communication with) at least a portion of the acoustic imaging system such that the acoustic imaging system is acoustically/mechanically coupled to the acoustic medium via the bottom surface. Similarly, the top surface of an acoustic medium described herein is understood to define an imaging surface; an object engaging the top/imaging surface may cause reflection(s) back to the bottom surface that, in turn, can be used to generate an image leveraging techniques described herein.

An array of acoustic transducers can be arranged in a pattern and positioned near the bottom surface. As described above, to capture an image of an object engaging the top surface, an acoustic imaging system can cause the array, or only a portion thereof, to propagate an acoustic pulse through the bottom surface of the acoustic medium and toward the object.

When the acoustic pulse reaches the top surface of the acoustic medium, a portion of the acoustic pulse may be reflected back towards the array of acoustic transducers. As noted with respect to other embodiments described herein, the reflection(s) can be collected as an acoustic output from the acoustic medium and an image of the top surface of the acoustic medium can be approximated. In many embodiments, these operations of driving at least a portion of the array and receiving voltage signals (or current signals, or any other electrical signal) from the array (corresponding to reflections from the top surface of the acoustic medium, as referred to as the imaging surface), can be performed at least in part by an application-specific integrated circuit.

In many embodiments, an acoustic imaging system can implement the array of acoustic transducers as a number of individual ultrasonic elements formed from piezoelectric material such as lead zircanate titinate, zinc oxide, aluminum nitride, or any other piezoelectric material.

Piezoelectric materials may be selected for the speed with which the materials can react to an electrical stimulus or excitation and/or mechanical stimulus or excitation. In other words, piezoelectric materials can be selected for certain acoustic imaging systems requiring acoustic pulses of particularly high frequency (e.g., megahertz scale, such as 50 MHz).

In these examples, to capture an image of an object engaging the top surface (e.g., fingertip, stylus tip, and so on), the imaging system can cause one or more array of piezoelectric transducers to propagate an acoustic pulse (e.g., such as a plane wave or as a localized pulse having a specified center frequency) generally normal to the bottom surface and toward the object in order to monitor for any acoustic signals reflected therefrom. As noted above, this operation is referred to herein as "driving" the array of piezoelectric transducers. In other cases, driving a piezoelectric transducer/element may not necessarily generate an acoustic pulse normal to the bottom surface.

For example, as may be appreciated, an acoustic pulse may propagate from a single point source along a generally spherical three-dimensional trajectory. In some examples, such as noted above, acoustic energy propagating along a particular angle from a point source (e.g., a single acoustic transducer) may be timed so as to constructively interfere with an acoustic pulse output from a different acoustic transducer.

Such embodiments leverage beamforming techniques and/or phased array control techniques to increase signal-to-noise ratios and/or image contrast. It is appreciated that these examples are not exhaustive; other driving/timing/control means may be possible in view of the description provided herein. For simplicity of description, many embodiments described herein reference a control schema in which an application-specific integrated circuit tasked with driving a piezoelectric transducer does so one transducer at a time. It is appreciated, however, that this is merely one example; in other cases, multiple transducers can be simultaneously driven and/or driven in a specifically-timed sequence (e.g., for beamforming purposes).

Notwithstanding the foregoing, and as described in reference to other embodiments described herein, when the acoustic pulse reaches the imaging surface of the acoustic medium, a portion of the acoustic pulse may be reflected from the imaging surface and back towards the array of piezoelectric transducers as a result of the acoustic boundary (e.g., acoustic impedance mismatch) between the imaging surface and the portion of object engaging it.

For example, a ridge of a fingerprint may present a different acoustic boundary when touching the acoustic medium (e.g., soft tissue boundary) than a valley of a fingerprint (e.g., air boundary). Accordingly, a ridge of a fingerprint may reflect the acoustic pulse differently than a valley of a fingerprint. In other words, a ridge of a fingerprint produces a different acoustic output than a valley of a fingerprint.

When the acoustic pulse returns to the array of piezoelectric transducers, the elements can be used to capture the reflection as electrical signals or, more precisely, an application-specific integrated circuit conductively coupled to one or more of the piezoelectric transducers receiving the reflections may include an analog to digital converter configured to sample (at a Nyquist-appropriate frequency) voltage output from the one or more of the piezoelectric transducers. As noted above, this operation is referred to herein as "sensing" or "imaging" with the array of piezoelectric transducers. In other cases, voltage sampling may not be required; capacitive storage may be used (as one example) to determine voltage output at a given time.

For example, when an array of piezoelectric transducers receives a portion of the acoustic reflection affected by a ridge of a fingerprint, that array of piezoelectric transducers may produce an electrical signal that is different than the electrical signal produced by an array of piezoelectric transducers receiving a reflection affected by a valley of a fingerprint.

By analyzing the electrical signals, the imaging system can derive an image of the object engaging the imaging surface of the acoustic medium. For example, each electrical signal can correspond to one pixel of the image. In one embodiment, a pixel corresponding to an electrical signal affected by a ridge of a fingerprint may be lighter than a pixel corresponding to an electrical signal affected by a valley of a fingerprint.

As may be appreciated, this may be due to the fact that the acoustic impedance mismatch between air and the acoustic medium is greater than the acoustic impedance mismatch between a fingerprint ridge and the acoustic medium.

FIG. 2A depicts a simplified block diagram of an acoustic imaging systems that can be used with the electronic device 100 of FIG. 1. The acoustic imaging systems 200 can include one or more acoustic transducers 202. The acoustic transducers 202 can contract or expand rapidly in response to an electrical stimulus such as a voltage or current (e.g., electroacoustic transducer). For example, the acoustic transducers 202 can be formed, in certain embodiments, from a piezoelectric material such as lead zircanate titinate, zinc oxide, aluminum nitride, or any other piezoelectric material and may have a piezoelectric response characterized as d31, d32, or d33.

In many embodiments, the acoustic transducers 202 can be configured for both emitting and detecting acoustic signals. In other words, an acoustic transducer 212 can be used to both transmit an acoustic pulse in response to an electrical stimulus/excitation (such as from a voltage wavelet generated by an application-specific integrated circuit, such as described herein) and, in addition, can generate a voltage signal in response to an acoustic output (e.g., acoustic/mechanical energy received as a reflection) from the acoustic medium.

In many examples, the acoustic transducers 202 can be arranged in a pattern. For example, in some embodiments the acoustic transducers 202 can be arranged in an evenly spaced line such as illustrated in FIG. 2A. In some embodiments, the acoustic transducers 202 can be arranged in a matrix or grid, as shown in FIG. 2B. In some examples, the matrix of the acoustic transducers 202 can be square or otherwise rectangular. In other examples, the matrix of the acoustic transducers 202 can take other shapes, such as a circular pattern (not shown).

Although many embodiments described herein distribute the acoustic transducers 202 in a uniform pattern (e.g., matrix, square, line, circle, and so on), such uniformity is not necessarily required, and in some examples, different regions may enjoy different concentrations/pitches of acoustic transducers.

The acoustic transducers 202 can be coupled to a controller 204, also referred to as an application-specific integrated circuit. The controller 204 can be configured to provide electrical energy (e.g., voltage signals) to each acoustic transducer 212 independently, or to groups of acoustic transducers collectively/simultaneously. For example, the controller 204 can provide a first voltage signal (e.g., chirp, wavelet, and so on) to a first transducer and a second voltage to a second transducer (e.g., phase-shifted chirp, wavelet, and so on). In addition, the controller 204 can control the duration and magnitude of the electrical energy applied to each independent acoustic transducer 212. Further, the controller 204 can be configured to control a center frequency of any voltage signal applied to the transducers; for example, the controller 204 can be configured to control a center frequency of a wavelet to be greater than 40 MHz, such as 50 MHz.

In many examples, the controller 204 can operate in one or more modes, either simultaneously, according to a duty cycle, or in another suitable manner. In certain embodiments, the controller 204 can have an integration mode.

In other embodiments or implementations, the integration mode can be referred to as an integration mode or a drive mode. Accordingly, as used herein, terms and phrases such as "integration mode" and "drive mode", may be understood to each refer to the same operational mode of an acoustic imaging system.

When in the integration mode, the controller 204 can be configured to provide electrical energy in the form of a voltage signal having high frequency content (e.g., a center frequency above 40 MHz, such as 50 MHz) to one or more of the acoustic transducers 202 and in response, the acoustic transducers 202 can produce an acoustic output, referred to herein as an acoustic pulse. As may be appreciated the acoustic pulse produced by one or more transducers typically exhibits the same frequency content as the voltage signal used to excite the transducers.

In many embodiments, and as noted above, the acoustic imaging system 200 can be disposed within a housing of an electronic device.

In some examples, the acoustic imaging system 200 can be segmented into an array of sub-portions. Each subportion may include a dedicated controller 204, or at least a dedicated portion of the controller 204. For example, in some embodiments, the acoustic transducers 202 can be arranged in a high aspect ratio (e.g., greater than 1) array of 128×42.

In this configuration, the array can be subdivided into a grid of 4×2 tiles, in which each subportion of the grid includes 32×21 individual acoustic transducers. Each of these individual subgroups of acoustic transducers can be controlled and/or operated independent of each of the other individual subgroups of acoustic transducers. In some examples, each individual subgroup (or "tile") is associated with a respective dedicated controller 204 which can perform both drive and/or sense operation for that individual tile.

In other cases, only a portion of the operations of a controller (e.g., drive operations, sense operations, filtering operations, beamforming operations and so on) can be dedicated to a particular tile. For example, in some cases, each tile may have a shared analog front end for sensing, may share a drive controller for drive operations, and so on.

In view of the foregoing, it may be appreciated that an array of acoustic transducers as described herein can be subdivided into any set of tiles, which may be rectilinear, square, or may follow any pattern (e.g., tessellating patterns, concentric patterns, linear patterns, rows and columns, and so on). Each subdivision of an array of acoustic transducers as described herein can be controlled independently with independent control electronics, and/or may be controlled in cooperation with one or more other subdivisions or tiles.

For example, FIG. 2C depicts the acoustic imaging system of FIG. 2A positioned below an acoustic medium 206. As noted with respect to FIG. 1, the acoustic medium 206 can be a portion of a display, a portion of an input device (e.g., button, switch, and so on), or a portion of the housing of the electronic device. The acoustic medium 206 can include active components (e.g., circuits, circuit traces, batteries, and so on) or passive components (e.g., glass sheet, metal sheet, and so on) or a combination thereof.

The acoustic medium 206 defines a bottom surface and an imaging surface. The bottom surface is coupled to the acoustic transducers 202 via an adhesive layer 208, which may be optional. The imaging surface of the acoustic medium 206 is opposite the bottom surface and is configured/oriented to receive an object, such as a finger of a user 210. As with other embodiments described herein, the finger of the user 210 may include one or more features that introduce different acoustic impedance mismatches when wetting to the imaging surface of the acoustic medium 206.

The acoustic transducers 202 can be positioned below the acoustic medium 206 so as to be in acoustic communication with the bottom surface, acoustically coupled to the bottom surface via the adhesive layer 208. In this manner, when an acoustic transducer 212 generates an acoustic wave 214 in response to an excitation from the controller 204 (in the interrogation mode), the acoustic wave 214 can propagate into the acoustic medium 206, through the bottom surface, toward the imaging surface and, in turn, toward any feature(s) of the fingerprint of the user 210, such as a valley 216 or a ridge 218.

While the acoustic wave 214 propagates through the acoustic medium 206 toward the imaging surface, the controller 204 can transition partly or entirely into an imaging mode, such as depicted in FIG. 2D. When in the imaging mode, the controller 204 can be configured to receive, sample, and/or analyze an electrical signal from one or more of the acoustic transducers 202 that corresponds to an acoustic output of the acoustic medium 206 resulting from a portion of a reflection (such as reflections 214a, 214b, or 214c) of the acoustic wave 214 (see, e.g., FIG. 2C), such as may originate as a result of wetting of the ridge 218 to the imaging surface and/or as a result of an air gap captured by the valley 216. It may be appreciated that a certain portion of energy of the acoustic wave 214 may be absorbed by the user's finger; this absorbed energy is depicted as the acoustic wave 214d.

Phrased in another non-limiting manner, in many embodiments, an acoustic reflection from a particular location along the imaging surface may depend upon whether that location is below the ridge 218 or the valley 216. More particularly, the acoustic boundary between the acoustic medium 206 and the ridge 218 (having an acoustic impedance of soft tissue) may cause a measurably smaller amplitude acoustic reflection than the acoustic boundary between the acoustic medium 206 and the valley 216 (having an acoustic impedance of air).

As noted above, the amplitude of a reflection from a ridge/acoustic medium acoustic boundary may be a smaller than the amplitude of a reflection from a valley/acoustic medium acoustic boundary. In other words, the amplitude of an acoustic reflection 216c from an area of the imaging surface that is below a ridge 218 may be less than the amplitude of an acoustic reflection 214a, 214b from an area of the imaging surface that is below a valley 216. Accordingly, the controller 204, when in an imaging mode, can monitor the amplitude (and/or timing, phase, or any other suitable property) of an acoustic reflection to derive, determine, assemble, or create, an image of the ridges and valleys of a user's fingerprint or, more generally, any suitable contour of any suitable object wetting to the imaging surface.

Accordingly, more generally and broadly, it may be appreciated that an acoustic imaging system such as described herein includes two primary components: an array of acoustic transducers and an application-specific integrated circuit configured to operate in a drive mode and a sense mode. In some examples, the drive mode and the sense mode can be time multiplexed, whereas in other examples, a drive mode may be configured to operate in one region while a sense mode is configured to operate in another region.

A person of skill in the art may readily appreciate that any suitable control schema can be used. For example, in some cases as described herein beamforming techniques can be used to concentrate acoustic energy output from two or more acoustic transducers of an array of acoustic transducers at a particular location. In some examples, beamforming may also be used in a receive mode to spatially filter a received signal or set of received signals.

Further, it may be appreciated that a planar imaging surface is not a requirement of the embodiments described herein. A person of skill in the art may readily appreciated that the systems methods and architectures described herein can be readily applied to image wetting of an object to a non-planar surface. For example, FIG. 2E depicts an acoustic imaging systems 200 can include one or more acoustic transducers 202 communicably coupled to a controller 204 that can be configured to operate in a drive mode and/or a sense mode, such as described above.

The controller, as with other embodiments described herein can operate the one or more acoustic transducers 202 as a monolithic entity (e.g., driving all or substantially all transducers at the same time to generate a plane wave) or may subdivide control of the array of transducers such that only some of the one or more acoustic transducers 202 are actively imaging (e.g., being driven and/or used for sensing) at any given time.

In such examples, it may be appreciated that the controller can execute any suitable sweep pattern, beamforming technique, or spatial or temporal filtering technique. In this example, however, the acoustic medium 206 may take a nonplanar shape, such as a convex shape.

An example implementation in which the acoustic medium 206 has a convex shape may be an implementation in which the acoustic imaging system 200 is incorporated into a sidewall of a housing of an electronic device, such as shown in FIGS. 1B and 1C. In other cases, the acoustic imaging system 200 can be incorporated into an electronic device that has a curved portion of a housing, such as a smartwatch with a curved exterior surface (which may be a sidewall surface, a crown surface, a button surface, or any suitable exterior surface).

Further to the foregoing, it may be appreciated that convex and planar sensing plat shapes are not limiting; more generally, any acoustic medium geometry and/or acoustic medium side cross-section can be used. For example, FIG. 2F depicts a convex acoustic medium 206 that may be used in certain implementations.

It may be appreciated by a person of skill in the art that an acoustic imaging system as described herein can be incorporated into any suitable electronic device, whether portable or stationary, and may be positioned relative to any suitable acoustic medium or sensing surface or imaging surface. In some examples, the acoustic medium may be planar and formed from glass. In other cases, the acoustic medium may be nonplanar and may be formed from metal, such as titanium.

In yet other examples, the acoustic medium may be curved and/or patterned and the acoustic medium may be a ceramic material. It may be further appreciated that control of an acoustic imaging system may vary by implementation in part due to differences in acoustic propagation speed through different materials. In other words, it may be appreciated that an acoustic imaging system as described herein can be incorporated in to many electronic devices, formed from many different materials, and may necessarily operate and/or be configured to operate in different manners based on the selected implementation.

FIG. 3 depicts a simplified block diagram of an acoustic imaging system 300 having both drive and sense modes of operation. An acoustic transducer array 302 can include two or more acoustic transducers. For example, in some embodiments the acoustic transducer array 302 can include an N×M array of individual transducers, which in turn can be subdivided and/or tiled into an A×B array of tiles, each tile including (N/A)×(M/B) individual acoustic elements. For example, an acoustic array can include 1000×100 acoustic elements, divided into 10×2 tiles. In this example, each tile includes 100×50 transducers. In this example, the array is rectilinear and has a high aspect ratio (e.g., greater than 2.0), but this structure may not be required of all embodiments.

Returning to FIG. 3, conductively coupled to the acoustic transducer array 302 can be a drive controller 304, which may be a portion of an application-specific integrated circuit, such as described herein. The driver controller 304 can be configured to deliver a voltage signal, such as a wavelet with a specified center frequency, to one or more transducers of the acoustic transducer array 302.

In some cases, the drive controller 304 can be implemented as a plurality of drive controllers 304. For example, in such an embodiment, each individual transducer of the array of acoustic transducers 302 can be coupled to a respective one drive controller 304. In another example, a single drive controller 304 can be coupled to a subset or subarray of acoustic transducers of the array of acoustic transducers 302. In these and related embodiments, adjacent transducers (and/or all transducers of the acoustic transducer array 302) can share one or more electrodes or traces associated with the drive controller 304.

Conductively coupled to the acoustic transducer array 302 can be a sense controller 306, which may be a portion of an application-specific integrated circuit, such as described herein. The sense controller 306 can be configured to receive a voltage signal (or any other suitable electrical signal) from one or more transducers of the acoustic transducer array 302. As with the drive controller 304, in some cases, the sense controller 306 can be implemented as a plurality of sense controllers 306.

For example, in such an embodiment, each individual transducer of the array of acoustic transducers 302 can be coupled to a respective one sense controller 306. In another example, a single sense controller 306 can be coupled to a subset or subarray of acoustic transducers of the array of acoustic transducers 302. In these and related embodiments, adjacent transducers (and/or all transducers of the acoustic transducer array 302) can share one or more electrodes or traces associated with the sense controller 306.

These foregoing embodiments depicted in FIGS. 2A-3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, acoustic transducers such as described herein can be constructed in a number of ways. In typical embodiments, an acoustic transducer or, more precisely, an array of acoustic transducers, is manufactured using thin-film deposition techniques such that the array is formed over and/or formed with an application-specific integrated circuit that performs drive and sense operations, such as described herein. However, this is merely one example construction; other embodiments in which a stack of layers defining an acoustic transducer is disposed over an application-specific integrated circuit are also possible in view of the description provided herein.

Figure 4:
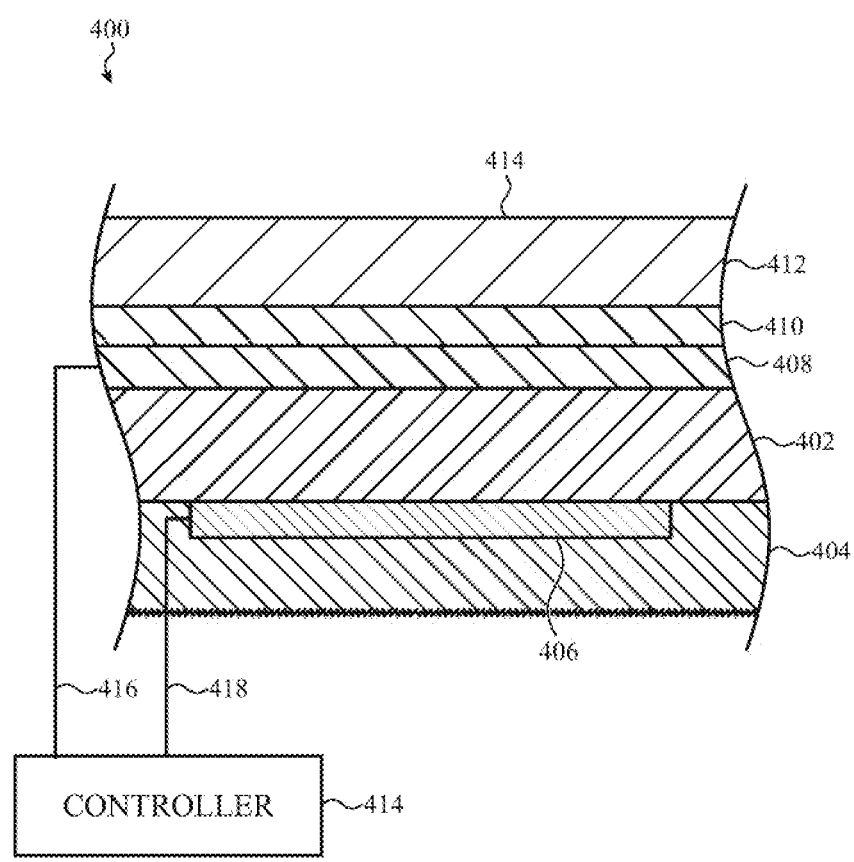
FIG. 4 depicts an example simplified detail view of a thin-film acoustic imaging system, such as described herein (see, e.g., FIG. 1A, taken through section A-A), including a thin-film piezoelectric actuator.
Figure 5:
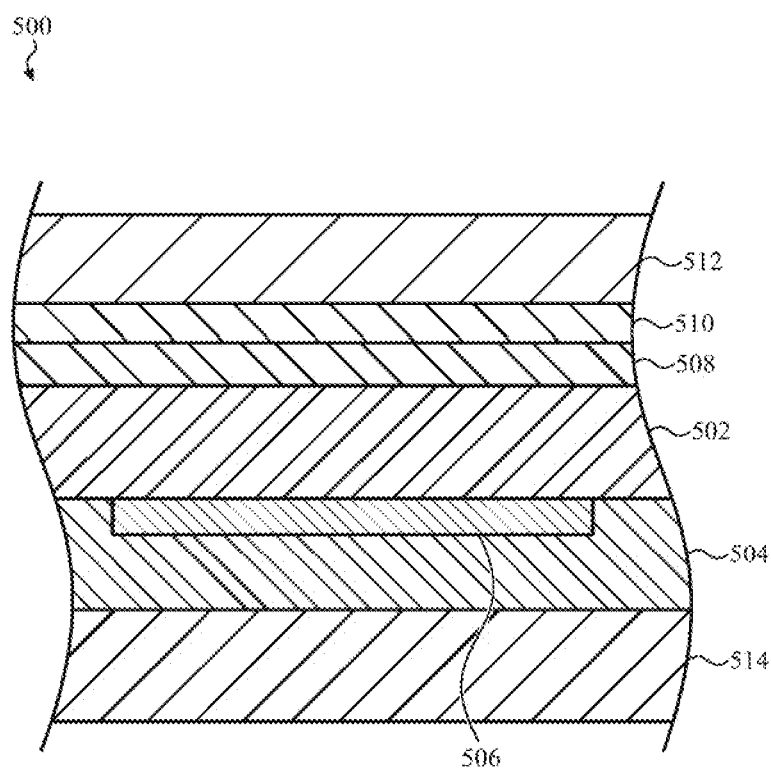
FIG. 5 depicts another example simplified detail view of a thin-film acoustic imaging system, including a thin-film piezoelectric actuator formed over an application-specific integrated circuit.

For example, generally and broadly, FIGS. 4-5 depict simplified system diagrams of an acoustic imaging system, such as described herein, that can be formed entirely using a thin-film manufacturing process in which an integrated circuit or any other suitable CMOS or other semiconductor circuitry is formed in substantially the same process as an array of thin-film, individually addressable piezoelectric transducers suitable to generate an acoustic pulse or a phased-array of acoustic pulses, such as described herein.

As a result of these described and related configurations, an acoustic imaging system such as described herein can be manufactured without a requirement for alignment of an array of microelectromechanical piezoelectric transducers with signal traces, solder pads, or other electrical or mechanical coupling(s), as noted above. As such, an acoustic imaging system, such as described herein, can be manufactured at a more rapid and cost-effective pace and/or can be coupled to an acoustic medium (such as an electronic device housing as shown in FIGS. 1A-1C) to define an imaging surface in a number of suitable ways, several of which are described below.

FIG. 4 depicts a simplified detail view of a thin-film acoustic imaging system, such as described herein (see, e.g., FIG. 1A, taken through section A-A), including a piezoelectric actuator formed from a thin film that exhibits a piezoelectric property or response, such as polyvinylidene fluoride (PVDF) or trifluoroethylene (TrFE). In some cases, the thin film may be formed from a copolymer such as a vinylidene fluoride and trifluoroethylene blend (e.g., PVDF-TrFE). In some cases, a material such as PVDF-TrFE may be selected due at least in part to simplicity of manufacturing and CMOS-compliant annealing temperatures.

In this embodiment, a high impedance stack of layers 400 is shown. The high impedance stack of layers 400 defines a piezoelectric element that is also referred to as an acoustic transducer. The transducer is configured to convert acoustic energy into electrical potential and vice versa.

In this example, the high impedance stack of layer 400 includes a thin-film piezoelectric layer 402 that is configured to expand and contract along a vertical axis. The thin-film piezoelectric layer 402 may be monolithic or may be segmented and/or divided to define multiple discrete acoustic transducers. For simplicity of illustration, only a single acoustic transducer is shown in FIG. 4, but it may be appreciated that the thin-film piezoelectric layer 402 may be used to define multiple discrete acoustic transducer elements.

The thin-film piezoelectric layer 402 is supported by a support layer 404 (which may also be referred to as an oxide layer, or any other non-conductive insulating layer of material; the layer may be contiguous and/or monolithic or may be formed from multiple layers of material) that encloses a first electrode 406 (which is understood as a portion of a first electrode layer, in array-based acoustic imaging system embodiments; in such examples, the first electrode 406 is a member of an array of electrodes, each of which is isolated from each other and/or conductively decoupled from one another to define an array of electrically distinct and individually-addressable electrodes) against a bottom surface of the thin-film piezoelectric layer 402.

The support layer 404 can be made of a metalloid oxide, such as silicon dioxide. In such embodiments, the support layer 404 may be referred to as a metalloid oxide layer, a passivation layer, an encapsulation layer, or a dielectric layer.

The first electrode 406 can be made from a metallic, and electrically conductive, material such as aluminum. A second electrode 408 (which, as with the first electrode layer is understood as a portion of a second electrode layer, in array-based acoustic imaging system embodiments; the layer may be monolithic or segmented, as described above with respect to the first electrode layer) is disposed onto a top surface of the thin-film piezoelectric layer 402, and may also be made from a metal material, such as molybdenum. In other cases, other metal materials or electrically conductive materials may be used.

The second electrode 408 may be coupled, via an optional adhesive/epoxy layer 410, to a lower surface of an acoustic medium 412. In other cases, the optional adhesive/epoxy layer 410 may be, or may include, a passivation material, such as SiO2.

As a result of this construction, a controller 414 (which may be a portion of an application-specific integrated circuit, such as described herein) can be conductively coupled to the first electrode 406 and the second electrode 408 via one or more routing traces (such as the traces 416, 418) so that the controller 414 can both drive the thin-film piezoelectric layer 402 and sense electrical signals from the thin-film piezoelectric layer 402.

More specifically, as a result of the depicted construction, a voltage signal (such as a chirp signal or a wavelet) output from the controller 414 can cause a voltage potential difference between the first electrode 406 and the second electrode 408 (polarity and/or frequency content of the voltage may vary from embodiment to embodiment) thereby causing the thin-film piezoelectric layer 402 to vertically expand or contract in proportion to the voltage signal which, in turn, results in a mechanical deformation of the thin-film piezoelectric layer 402 along a direction perpendicular to a lateral axis, normal to the lower surface of the acoustic medium 412, thereby generating an acoustic pulse through the adhesive/epoxy layer 410 that can, thereafter, propagate into and through the acoustic medium 412.

Thereafter, reflections from an upper surface 414, some of which may be absorbed as a function of acoustic impedance mismatch, may propagate through the acoustic medium 412 back to the thin-film piezoelectric layer 402

In one specific implementation, the support layer 404 has a thickness of approximately 2 µm, the first electrode 518 has a thickness of approximately 0.1 µm, the thin-film piezoelectric layer 402 has a thickness of approximately 1.0 µm, the second electrode 412 has a thickness of approximately 0.1 µm, and the adhesive/epoxy layer 416 has a thickness of approximately 3 µm.

These foregoing example thickness are merely illustrative of the relative thickness of the various layers that may be appropriate in certain configurations. In many examples, different thicknesses, including relative thicknesses may be suitable, especially upon consideration of a center frequency output by and received by the controller 414.

As a result of these constructions, a stiffener layer and a backing (which may be a vacuum cavity or other sealed volume) typical of conventional Piezoelectric Micromachined Ultrasonic Transducers (pMUT)/microelectromechanical transducers may be eliminated, along with manufacturing complexities and costs associated therewith. In addition, due at least in part to the reduced relative thickness of the adhesive/epoxy layer, an improved acoustic coupling between the high impedance stack of layers (such as shown in FIG. 4) and an acoustic medium can be achieved. This may be particularly advantageous for coupling to certain materials such as metals or ceramics, which may be selected for electronic device housings.

As noted with respect to other embodiments described herein, each layer depicted and described with reference to FIG. 4 can be manufactured using a thin-film deposition/manufacturing process. In such examples, alignment complexities and other manufacturing challenges related to tolerances can be eliminated.

For example, as noted with respect to other embodiments described herein, a high impedance stack of layers forming an acoustic transducer, such as described herein can be formed along with and/or over an application-specific integrated circuit that, in turn, can be configured to perform, coordinate, trigger, or otherwise execute one or more operations of a controller such as described herein.

Examples include driving one or more transducers and/or sensing with one or more transducers. For example, FIG. 5 depicts the stack-up as shown in FIG. 4 (the description of which is not repeated herein) formed atop a semiconductor circuit that defines one or more operations of the controller 414 (e.g., drive operations, sense operations, beamforming control, and so on), which as noted above may be an application-specific integrated circuit or any other suitable thin-film transistor circuit, pattern of electrical traces, bridges, or pads, or any other suitable analog or digital circuitry.

For example, as with the embodiment depicted in FIG. 4, the embodiment shown in FIG. 5 includes a thin-film piezoelectric layer 502 disposed over a dielectric layer 504 which encloses, against the thin-film piezoelectric layer 502, a first electrode 506. The embodiment 500 also includes a second electrode 508 that in turn may be coupled via an adhesive 510 to an acoustic medium 512. Each of these layers may be formed over an integrated circuit 514.

In this example, the integrated circuit 514 may be formed by leveraging one or more conventional semiconductor manufacturing techniques suitable for forming one or more switching circuit elements and/or electrical traces. Example processes that may be used include lithographic processes, etch processes, implantation processes, mechanical and/or chemical polishing processes, annealing processes, and so on. A person of skill in the art appreciates that any suitable process or process sequence can be used to form any suitable circuit, the design and implementation of which varies from embodiment to embodiment.

Once the integrated circuit 514 is formed, the dielectric layer 504 can be disposed thereover using a suitable deposition or growth methodology. Next, a layer of conductive material can be disposed onto the newly deposited dielectric layer. This layer can be masked and etched to define geometry and positioning of the first electrode 506. Next, optionally, additional dielectric can be disposed to fully enclose/encapsulate the newly-defined first electrode. In other cases, the dielectric layer can be etched and filled with a material suitable for the first electrode. A person of skill in the art appreciates that may options are possible.

Over the first electrode and dielectric the thin-film piezoelectric layer 502 can be formed using a suitable technique (e.g., spin deposition). Optionally one or more of these layers can be mechanically or chemically polished or treated and/or otherwise prepared between development of subsequent layers. Over the thin-film piezoelectric layer 502, the second electrode layer can be formed. In some cases, intervening mask/etch processes may be required or preferred to develop particular geometry and/or structural features.

The foregoing example manufacturing method is not exhaustive of all methods that may be leveraged to form a thin-film piezoelectric layer such as described herein. Generally and broadly, it may be appreciated that because theses acoustic transducers can be formed with conventional semiconductor manufacturing methodologies, any suitable number of acoustic transducers can be formed over any suitable CMOS or other semiconductor circuitry, such as circuitry required to operate an acoustic transducer as described herein (e.g., drive mode, sense mode, and so on).

In addition, it may be appreciated that these foregoing example embodiments are not exhaustive of the various constructions of an acoustic imaging system, such as described herein. For example, although a single acoustic element (e.g., piezoelectric element) is depicted in FIGS. 4-5, it may be appreciated that an acoustic imaging system such as described herein it typically implemented with multiple discrete and/or physically-separated acoustic transducers arranged in a two-dimensional array (which may be flat and/or may follow a particular curve contouring to a particular acoustic medium geometry), each of which may be conductively coupled to at least a portion of an application-specific integrated circuit configured to initiate drive operations and/or sense operations leveraging said acoustic transducers. In particular, in such embodiments, the array of acoustic transducers may each include two discrete electrodes (e.g., an electrode pair) that can be individually conductively coupled to an application-specific integrated circuit, some or all of which may be physically coupled to the transducer itself, such as shown in FIG. 5.

In such embodiments, an array of electrode pairs, each of which is associated with a discrete piezoelectric actuator/acoustic transducer, can be disposed in a grid or matrix pattern, such as described above. In many cases, each electrode of an electrode pair takes the same shape and size, but this is not required; some embodiments include an upper electrode coupled to a top surface of a piezoelectric actuator that is made from a different material, in a different shape, formed to a different thickness, and so on contrasted with a lower electrode coupled to a bottom surface of the same piezoelectric actuator.

More generally and broadly, it may be appreciated that layers described above may be formed form a number of different materials, and/or may be formed in a number of suitable processes. For example, in some cases one or more electrodes of can be aluminum which may be sputtered to a thickness of 100 nm, or a greater thickness or a smaller thickness. In some cases, an adhesion layer may be formed as well to promote electrical and mechanical coupling. Titanium is one example material that may be used as an adhesion layer.

In other cases, other metals may be used for electrodes. In some examples, one electrode may be made from a first material to a first thickness (e.g., Al to 100 nm), and a second electrode can be made from a second material to a second thickness (e.g., Al/Ti to 100 nm); embodiments and implementations vary.

In some cases, a PVDF-TrFE thin-film layer can be formed by depositing a powder/solvent solution, allowing the solvent to evaporate, and thereafter annealing. In such examples, a PVDF-TrFE layer may be formed to a thickness of approximately 1.5 µm, or less than or greater than the same. Such a layer may be etched into multiple discrete regions by a suitable mechanical, chemical, electrical or other etching process such as reactive ion etching process.

These foregoing embodiments depicted in FIGS. 4-5 and the various alternatives thereof and variations thereto are presented, generally, for purposes of explanation, and to facilitate an understanding of various configurations and constructions of a single transducer of an acoustic imaging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, in many examples an acoustic imaging system as described herein can include an array of acoustic transducers. The array of acoustic transducers can be formed such as described above. For example, the array of transducers can be defined by a number of individual acoustic transducers, each of which is defined by a portion of a thin-film piezoelectric material disposed between two electrodes dedicated to that particular acoustic transducer.

Figure 6A:
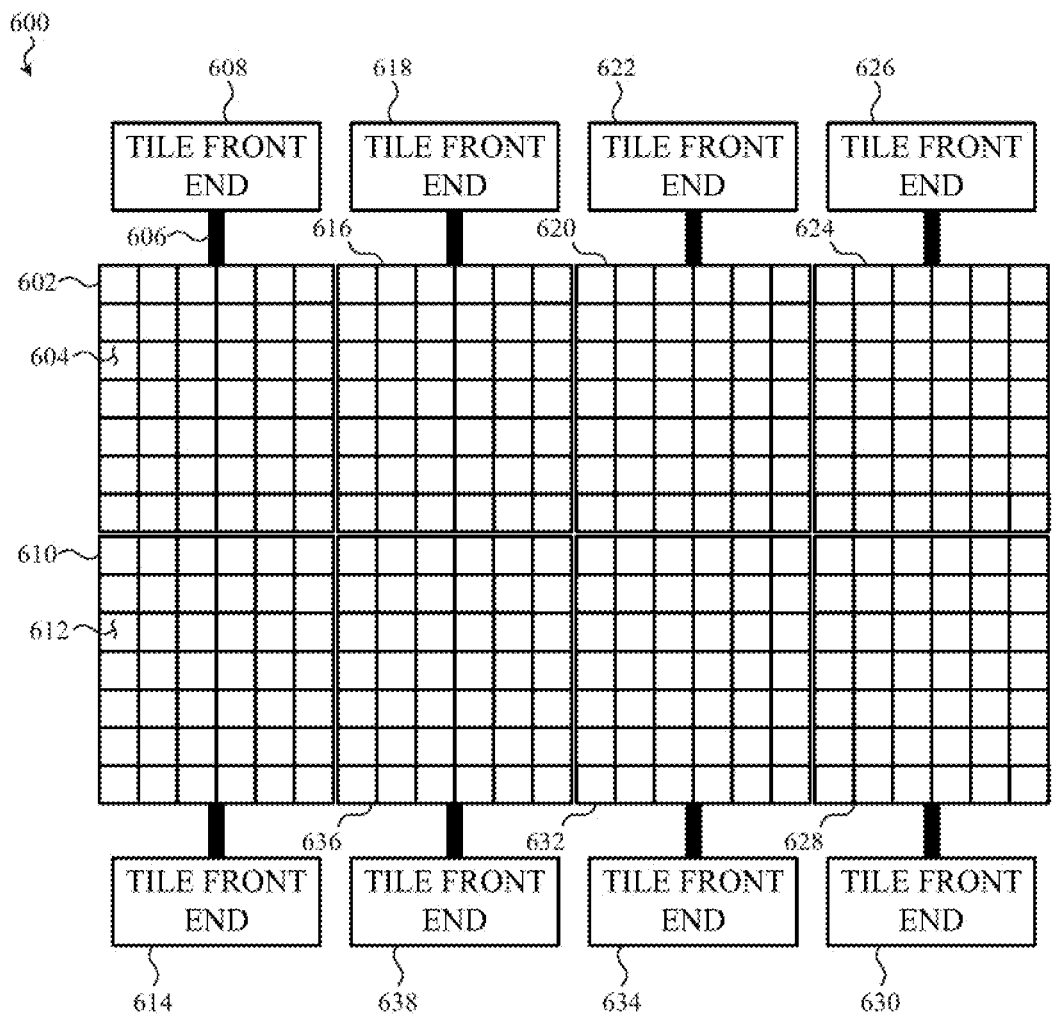
FIG. 6A depicts a system diagram of a segmented acoustic imaging system, as described herein.
Figure 6B:
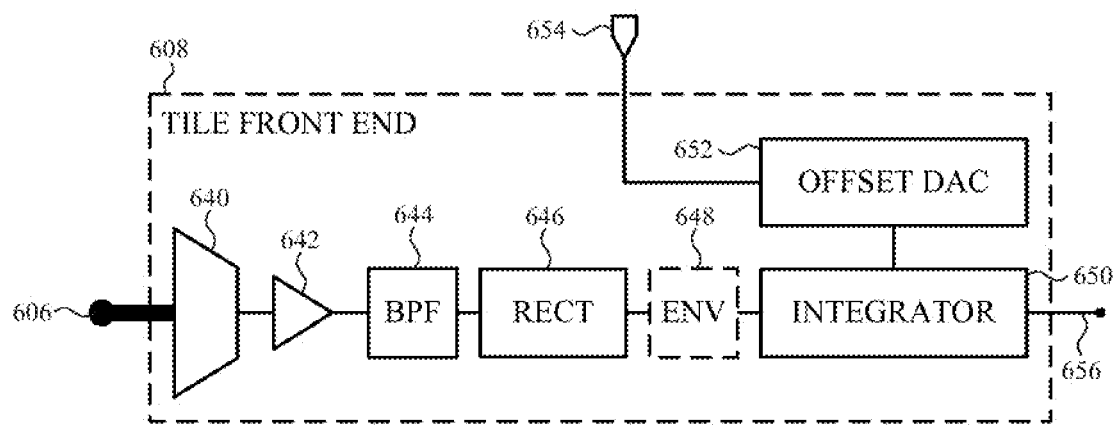
FIG. 6B depicts a schematic/signal flow diagram of an analog front end of a tile of a segmented acoustic imaging system as described herein.

In some examples, as noted above, the array of transducers can be subdivided and/or segmented into tiles. Each tile can included dedicated electronics optimized to drive and/or sense via the acoustic transducers of that particular tile. Such constructions and configurations can dramatically improve signal to noise ratios, reduce cost, reduce power consumption, and reduce manufacturing and signal routing complexity. FIGS. 6A-6C are provided to illustrate an example construction in which a high aspect ratio (e.g., 2) array of acoustic transducers, formed in a thin-film process such as described above, are segmented.

In particular, FIG. 6A depicts a system diagram of a segmented acoustic imaging system, as described herein. In this example, an array of thin film acoustic transducers 600 can include 336 individual transducers, arrange in a rectilinear pattern of 24×14. In this example, eight tiles/segments are shown, arranged in two rows of four tiles. Each tile includes and is dedicated to 6×7 acoustic transducers of the 336 transducers depicted in the illustrated embodiment.

In particular, a first tile 602 can include 42 separate and individually addressable thin-film acoustic transducer, one of which is identified as the acoustic transducer 604. Each transducer of the first tile 602, including the acoustic transducer 604 can be conductively coupled to a dedicated analog front end via a signal bus 606. The dedicated analog front end is identified in the figure as the tile front end 608.

In this construction, the tile front end 608 can be configured to receive and process and/or condition one or more analog voltage signals from one or more of the 42 acoustic transducers defining the first tile 602. For example, the tile front end 608 can be configured to demodulate AC signals received from the acoustic transducer 604, filter a voltage signal received from the acoustic transducer 604 (e.g., frequency-domain or time-domain filters, such as band pass, low pass, high pass, moving average, and so on), amplify a voltage signal received from the acoustic transducer, attenuate all or some of a voltage signal received from the acoustic transducer, store acoustic energy generated by the voltage signal, integrate a time-varying voltage signal received from the acoustic transducer 604 over a given time window, offset and/or bias a voltage signal received from the acoustic transducer 604 by a given amount or calibration value, and so on.

Other tiles of the array of thin film acoustic transducers 600 can be identical to the first tile 602, such as described above. For example, a second tile 610 can also include 42 independently addressable acoustic transducers, one of which is identified as the acoustic transducer 612. These transducers can be coupled to a tile front end 614. In the same manner, other tiles can be coupled each to a respective tile front end. For example, the tile 616 can be coupled to the tile front end 618, the tile 620 can be coupled to the tile front end 622, the tile 624 can be coupled to the tile front end 626, the tile 628 can be coupled to the tile front end 630, the tile 632 can be coupled to the tile front end 634, and the tile 636 can be coupled to the tile front end 638.

It may be appreciated that this example construction is merely provided as one example; any suitable number or arrangement of tiles may be selected. Similarly, in some embodiments, tiles may include different numbers of acoustic transducers. In other cases, some tiles may be differently shaped than other tiles. In some cases, tiles may be enclosed within other tiles (e.g., concentric arrangements). In other cases, one tile may circumscribe another tile. In some cases, some tiles may be coupled to the at least one common transducer; in other words, some tiles may overlap such that different tile front ends may be configured to control the same acoustic transducers (e.g., for redundancy).

Similarly, it may be appreciated that each individual analog front end may be configured in the same manner, or may be configured in tile-specific ways. For simplicity of description, the embodiments that follow presume a construction in which each tile of a given embodiment has the same number of transducers and is configured to operate in identical ways. In such examples, each respective analog front end may be defined, at least in part, in an integrated circuit over which the acoustic transducers of that particular tile are formed, such as described above.

FIG. 6B depicts a schematic/signal flow diagram of an analog front end of a tile of a segmented acoustic imaging system as described herein. More specifically, the depicted analog front end may be the tile front end 608 of the FIG. 6A, or any of the depicted tile front ends shown in FIG. 6A.

In particular, the tile front end 608 receives one or more input voltage signals via the signal bus 606. The signal bus 606 can provide input to a multiplexer 640 configured to iteratively switch between individual traces of the signal bus 606 so that individual signals corresponding to outputs of individual acoustic transducers can be individually processed and/or conditioned.

The multiplexer 640 may be configured to provide as output a time multiplexed voltage signal that iteratively shifts between two or more transducers of the first tile 602. In some examples, the multiplexer 640 is configured to linearly shift between transducers, advancing row by row or column by column. In other cases, the multiplexer 640 is configured to follow a serpentine multiplexing pattern. In yet other cases, the multiplexer 640 can be controlled at least in part by a beamforming controller informing selection among traces associated with the signal bus 606 based on a timing and/or phase difference pattern; any suitable pattern may be used, some of which may switch between all acoustic transducers, some of which may switch between only a subset of the acoustic transducers of the first tile 602.

At a given time, an output of the multiplexer 640 may correspond to a single voltage signal generated by a single acoustic transducer. For simplicity of description the embodiments that follow reference an output of the acoustic transducer 604 as shown in FIG. 6A and described in reference thereto. It may be appreciated however, that the embodiments and signal conditioning and modification operations and stages that follow may be likewise applied to any output of any suitable acoustic transducer or combination of transducers; in some examples, outputs from one or more transducers may be combined in the analog domain prior to being received by the tile front end 608.

A voltage signal output from the multiplexer 640 is provided as input to a first amplifier 642, which may be configured to amplify the voltage signal by a fixed or variable amount. A gain profile of the first amplifier 642 may be linear or non-linear. In some cases, gain may be frequency dependent. In other cases, gain may be informed by and/or based on a configuration parameter based on and/or associated with particular individual acoustic transducers. In these embodiments, manufacturing differences between individual transducers can be compensated for by varying gain of the first amplifier 642. The gain profile of the first amplifier 642 may be selected so as to not saturate downstream signal processing electronics; in some cases, maximum gain may be selected automatically as a result of feedback received from one or more downstream signal processing stages. For example, a subsequent stage may be configured to detect when that stage is saturated or otherwise operating outside of a given operational parameter. In such examples, the subsequent stage may provider operational input to the first amplifier 642 to cause the first amplifier 642 to reduce its gain, at least with respect to a particular acoustic transducer.

An amplified voltage signal is output from the first amplifier 642 and provided as input to a band pass filter 644. The band pass filter 644 may be configured to attenuate and/or eliminate both high frequency content and low frequency content from the amplified voltage signal. The band width and center frequency at which the band pass filter 644 operates may vary from embodiment to embodiment.

In many cases, as noted above, an acoustic imaging system as described herein can be configured to operate in a drive mode at a particular center frequency. For example, a pulse or input provided to a given acoustic transducer may have a center frequency at a selected and controlled value. For convenient reference, this frequency is referred to herein as the "drive frequency," the "drive center frequency," or more generally, the "carrier frequency."

In these examples, the band pass filter 644 may be configured to filter the amplified voltage signal around the carrier frequency at which the acoustic imaging system operates. For example, if the acoustic imaging system is configured to operate at 10 MHz, the center frequency of the band pass filter 644 may be selected to be 10 MHz, with a bandwidth of 0.5 MHz. In other cases, other band widths and/or other center frequencies may be selected. For example, in some embodiments, a band pass filter such as the band pass filter 644 may be configured to target a harmonic of the carrier frequency. In other cases, the band pass filter 644 may have a larger band width; may configurations are possible, many of which are implementation specific.

The band pass filter 644 is configured to output a passband signal. The passband signal can be provided as input to a high-frequency rectifier 646. The rectifier 646 can be configured to be an asynchronous full-bridge rectifier or a synchronous rectifier. In many implementations, the rectifier 646 is an active, synchronous rectifier so as to reduce conduction losses and forward bias voltage drop.

The rectifier 646 may be configured to output a rippled direct current signal. In some cases, the rippled direct current signal may be applied as input to an optional low pass filter (e.g., a capacitor coupling the rippled direct current signal to ground) or other envelope following circuit, such as the optional envelope follower 648.

The envelope follower 648 and/or any other envelope detection circuitry can provide a low-frequency output voltage signal as input to an integrator 650 configured to integrate the low-frequency output voltage signal over a particular time window, which may be varied or constant. As a result of this construction the integrator 650 can effectively provide an output voltage that corresponds, at least in part, to a quantity of acoustic energy lost during a preceding drive operation to an acoustic impedance mismatch at an imaging area/surface such as described above.

More particularly, the greater an acoustic impedance mismatch between the acoustic medium into which an acoustic pulse is generate (by the acoustic imaging system), the greater quantity of acoustic energy that should be received as a reflection at one or more of the acoustic transducers of the array of acoustic transducers. As one specific example, a fingerprint valley accounts for a greater acoustic impedance mismatch than a fingerprint ridge, and is thus associated with a higher amplitude of acoustic reflection. As a result, an output of the integrator 650 is expected to be greater in the presence of a fingerprint valley than a fingerprint ridge.

As may be appreciated by a person of skill in the art, different acoustic impedance mismatches may result in different quantities of acoustic energy being received as a reflection at the acoustic imaging system. In particular, it may be the case—especially for particular acoustic media such as metals—that the overwhelming majority of acoustic energy received is from the drive signal itself. In another non-limiting phrasing, carrier noise dominates the signal received at the integrator 650.

To account for carrier noise, many embodiments include an offset digital to analog converter 652 configured to provide a fixed or variable voltage output as input to the integrator 650 so that carrier amplitude and/or carrier noise can be subtracted in real time from the output of the integrator 650. The offset digital to analog converter 652 can be configured to receive a digital control signal via a tap 654.

The tap 654 can provide a fixed voltage or a variable digital voltage based at least in part on a drive signal applied to one or more acoustic transducers. The tape 654 can provide a digital bias value that is based, at least in part, on feedback from an upstream or downstream signal conditioning stage. It may be appreciated by a person of skill in the art that the offset digital to analog converter 652 can provide any suitable offset that may vary based on beamforming operations, a position or physical location of a particular acoustic transducer, a waveform selected to drive at least one acoustic transducer, a type or characteristic of an acoustic medium and so on.

As a result of this construction, the integrator 650 can be configured to provide a conditioned signal via an output 656.

As noted above, each tile can be configured to operate in the same manner as the first tile 608.

These foregoing embodiments depicted in FIGS. 6A-6B and the various alternatives thereof and variations thereto are presented, generally, for purposes of explanation, and to facilitate an understanding of various configurations and constructions of a segmented/tiled acoustic imaging system with a hierarchy or staged arrangement of signal conditioning, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 7:
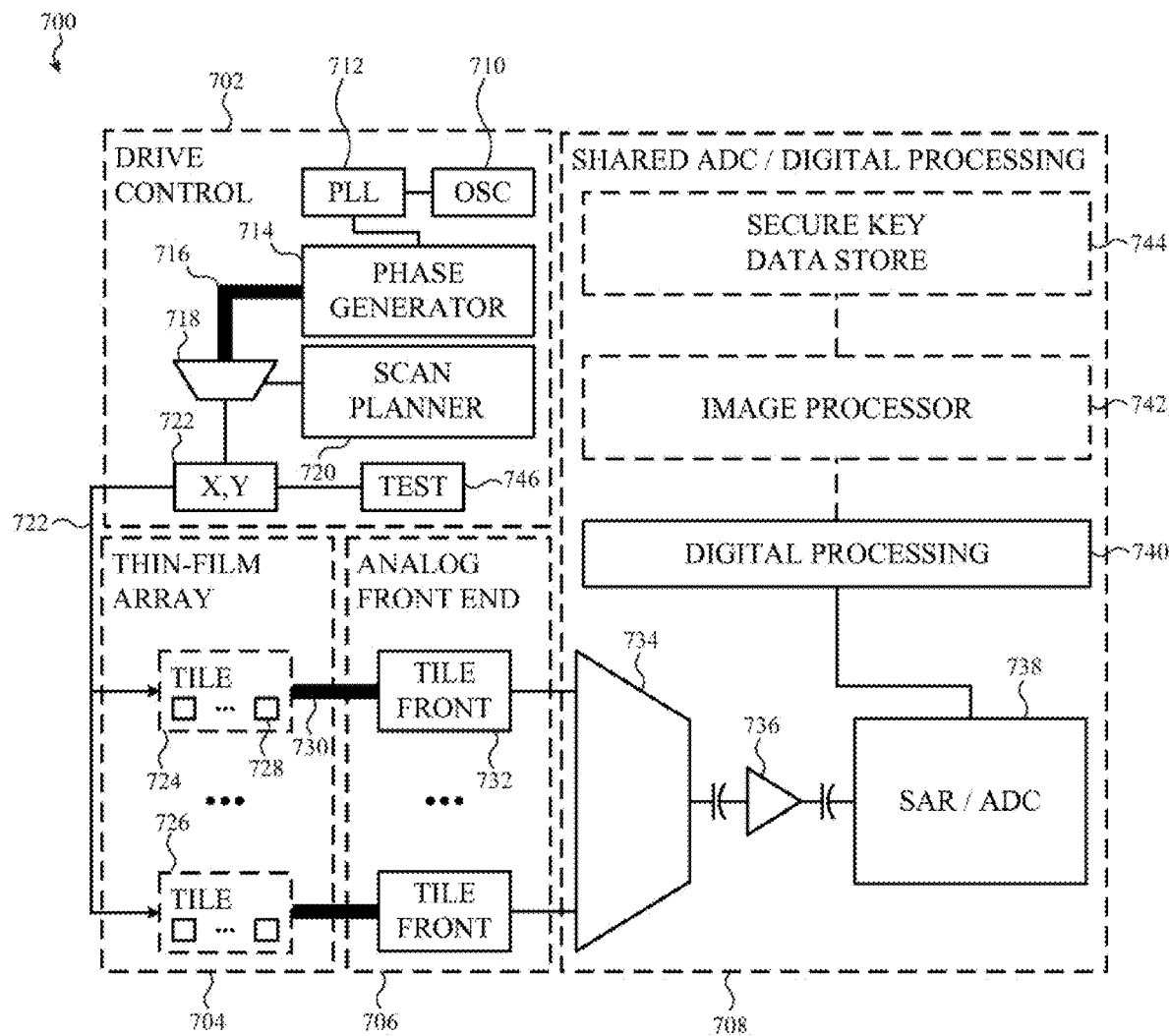
FIG. 7 depicts a system diagram of a segmented acoustic imaging system, as described herein.

For example, as noted above, an output of an individual tile can be provided as input to a single shared signal conditioning/analog to digital converter stage. FIG. 7 depicts a system diagram of a segmented acoustic imaging system, as described herein.

As with other embodiments described herein, the acoustic imaging system 700 includes a drive controller 702 that provides drive signals (which may have particular phase and/or waveform characteristics, following a beamforming pattern or scan plan) to one or more tiles and/or one or more individual acoustic transducers of an array of thin-film acoustic transducers 704. As noted above, the array of thin-film acoustic transducers 704 may be segmented into tiles, each of which may be associated with a dedicated one analog front end; collectively tile-level analog front ends are illustrated as the front ends 706.

Output from the front ends 706 can be provided as input to single shared analog to digital converter stage 708 which can be tasked with, and configured to, provide a digital output value that corresponds to acoustic impedance mismatch at a particular location of an imaging surface or imaging area associated with the acoustic imaging system 700.

More particularly, as noted above with respect to FIGS. 2A-2C, the drive controller 702 can include an oscillator 710 configured to provide a stable high frequency signal that may be sampled to generate one or more drive signals that, in turn, can be applied as input to one or more acoustic transducers of the array of thin-film acoustic transducers 704.

In many examples, the oscillator 710 is configured to oscillate at a stable frequency in the tens of MHz (e.g., 10 MHz, 20 MHz, 50 MHz, and so on), but this is not a requirement and a person of skill in the art may readily appreciate that different—either higher or lower—frequencies may be appropriate in particular embodiments.

The oscillator 710 can be kept in phase relative to other signal lines of the system by a phase lock loop 712. In many examples, the phase lock loop 712 is configured to synchronize the oscillator 710—or an output thereof—with a system clock and/or a harmonic thereof. As a result of this construction, downstream electronics, especially digital electronics, can be synchronized in with high frequency signals used in the analog domain to generate drive signals such as described above.

An output of the phase lock loop 712 can be provided as input to a phase generator 714 which can be configured to provide outputs via a signal bus 716, each of which represent a differently-delayed/differently-phased signal output from the phase lock loop 712. For example, in some embodiments the phase generator may be configured to provide eight signals as output; a first signal line transits a voltage signal precisely in phase with output of the phase lock loop, a second signal line transits a voltage signal 22.5 degrees out of phase with the output of the phase lock loop 712, a third signal line transits a voltage signal 45 degrees out of phase with the output of the phase lock loop 712, and so on.

Signals carried by the signal bus 716 can be provided as input to a multiplexer 718 that can be driven by a beamforming controller/scan planner 720. The beamforming controller/scan planner 720 can be configured to select which signal line (i.e., which phase delay) to apply at a particular moment. As may be appreciated by a person of skill in the art, the beamforming controller/scan planner 720 can leverage one, and/or be leveraged by, or more beamforming controllers that operate by applying differently-phased signals to differently located acoustic transducers.

An output of the multiplexer 718, selected by the beamforming controller/scan planner 720, can be provided as input to an address selector 722 configured to provide the output to a particular selected acoustic transducer of the array of thin-film acoustic transducers 704 via an output signal line 722. The address selector 722 can be configured to cooperate with the beamforming controller/scan planner 720 or may operate independently; many configurations and control paradigms are possible.

The signal carried by the output signal line 722 can be received at the intended, addressed, acoustic transducer of the array of thin-film acoustic transducers 704, which may be a member of a first tile 724, a second tile 726, or any other suitable tile. For simplicity of illustration, a single acoustic transducer of the first title 724 is identified as the target acoustic transducer 728.

As a result of this construction, when the target acoustic transducer 728 receives the signal carried by the output signal line 722, the target acoustic transducer 728 generates a mechanical output into an acoustic medium that has a center frequency based at least in part on the operating frequency (or a harmonic or sampled multiple thereof) of the oscillator 710.

As described with respect to other embodiments described herein, after a drive operation has been triggered, a sense operation may be initiated in which one or more voltage signals generated by one or more acoustic transducers of the array of thin-film acoustic transducers 704 (which may include the target acoustic transducer 728) can be received via, for example, a signal bus 730, at a tile-specific front end such as the tile front end 732. The tile front end 732 can operate in much the same manner as described above in reference to FIG. 6B; this description is not repeated.

The tile front end 732—and/or other tile front ends—can provide output thereof to a multiplexer 734 of the single shared analog to digital converter stage 708. The single shared analog to digital converter stage 708 can provide output to another amplifier, identified as the post-integration amplifier 736. As with other amplifiers described herein, the post-integration amplifier 736 can be configured to operate according to any suitable variable or fixed gain profile.

The single shared analog to digital converter stage 708 also includes a high frequency and high fidelity analog to digital converter 738. In some embodiments, a successive approximation analog to digital converter can be used; although this is not required of all embodiments.

The high frequency and high fidelity analog to digital converter 738 can provide a digital output to subsequent digital-domain processing systems, such as a digital image processor 740, an image processor 742 and/or a data store or key storage controller configured to gate output(s) of the acoustic imaging system 700 based on key-based authentication.

These foregoing embodiments depicted in FIG. 7 and the various alternatives thereof and variations thereto are presented, generally, for purposes of explanation, and to facilitate an understanding of various configurations and constructions of an acoustic imaging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although signal lines in FIG. 7 and FIGS. 6A-6B are illustrated as single signal lines, in many embodiments, multiple lines may be leveraged to convey differential signals.

In other examples, the acoustic imaging system 700 can be further configured for dark pixel subtraction. In such cases, a test controller 746 may be configured to provide a test signal to drive one or more acoustic transducers at a particular selected moment at which no imaging input is expected. Thereafter, output from the analog to digital converter 738 and/or another signal processing or signal conditioning stage can be used and/or stored to be subtracted at a later time during an imaging or sensing operation.

In yet other examples, additional carrier rejection operations can be performed in addition to the carrier subtraction/offset digital to analog converter described above in reference to FIGS. 6A-6B. For example, in some embodiments I-Q demodulation may be leveraged to mitigate effects of carrier noise. In other cases, envelope detection and/or following may be employed. In yet further examples, device specific and/or pixel specific configuration or calibration parameters can inform operations of the acoustic imaging system 700; some acoustic transducers and/or tiles may be associated with higher or lower gain than other acoustic transducers or tiles. Such example embodiments can be described as region-specific gain control embodiments.

In yet other examples, beamforming may be used for mechanical/analog carrier noise rejection. As noted above, beamforming operations and scan plans can be implemented in a number of ways. In addition, it may be appreciated that different beamforming techniques may be suitable for different implementations and/or different imaging conditions. For example, some scan plans may be more suitable in high humidity environments whereas other scan plans and/or beamforming techniques may be more suitable for low humidity, high temperature environments. In some examples, a first beamforming operation can be selected for a first scan plan whereas a second beamforming operation is selected for a second scan plan. In this example, the first scan plan can be performed prior to the second scan plan, after which results from both scan plans can be merged in a suitable manner.

Generally and broadly, FIGS. 8A-11C are provided to show various example beamforming operations associated with different scan plans or scan operations. It may be appreciated that these examples are not exhaustive.

Figure 8A:
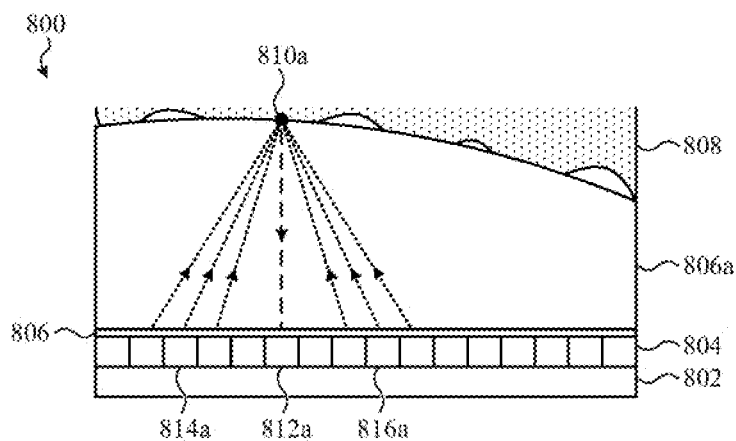
FIGS. 8A-8C depict a simplified cross-section of an acoustic imaging system as described herein, implementing a linear scan drive operation that leverages beamforming to focus acoustic energy emitted from multiple acoustic transducers at a selected location of a curved imaging surface.
Figure 8B:
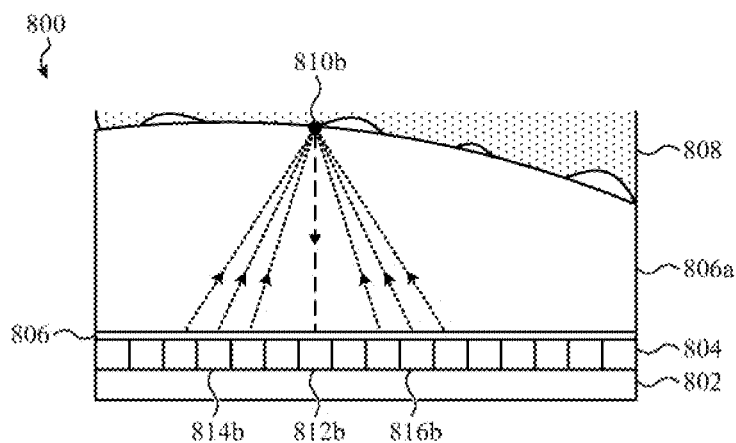
Figure 8C:
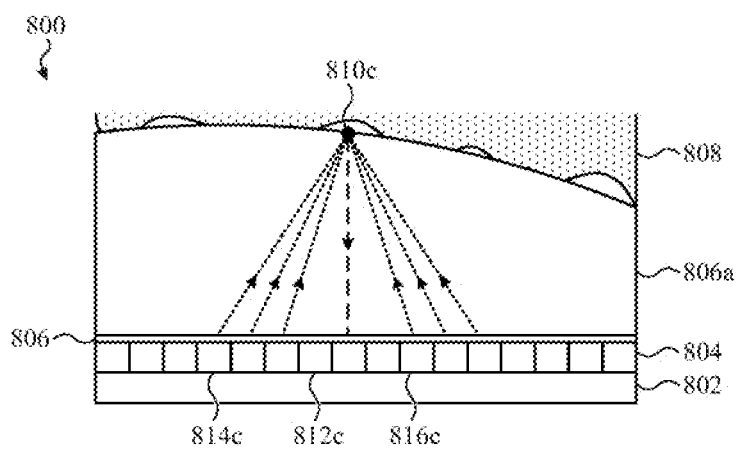

In particular, FIGS. 8A-8C depict a simplified cross-section of an acoustic imaging system as described herein, implementing a linear scan drive operation that leverages beamforming to focus acoustic energy emitted from multiple acoustic transducers at a selected location of a curved imaging surface.

In the illustrated embodiment, an acoustic imaging system 800 is shown. The acoustic imaging system 800 includes an application-specific integrated circuit 802 that may be communicably, conductively, and/or mechanically coupled to an array of acoustic transducers 804. As with other embodiments describe herein, the application-specific integrated circuit 802 of the acoustic imaging system 800 can be configured to perform or coordinate one or more drive or sense operations of the acoustic imaging system 800. Specifically, the application-specific integrated circuit 802 may be configured to operate one or more acoustic transducers of the array of acoustic transducers 804 in a drive mode or a sense mode.

Further, the application-specific integrated circuit 802 can be configured to operate one or more acoustic transducers of the array of acoustic transducers 804 according to a particular scan plan and/or beamforming operation. In these embodiments, the application-specific integrated circuit 802 can be configured as described above in reference to FIG. 6A-7, and may be configured to receive as input (and/or obtain from a database) one or more delay coefficients that the application-specific integrated circuit 802 can use to inform how and when drive signals are applied to one or more acoustic transducers of the array of acoustic transducers 804. For example, in a simplified embodiment, the array of acoustic transducers 804 can be configured to select a subset of transducers from the array of acoustic transducers 804 to operate in the drive mode. For convention, these selected transducers can be referred to as drive-mode transducers. A first drive-mode transducer can be drive by the application-specific integrated circuit 802 with a time/phase delay of N, whereas a second drive-mode transducer can be driven by the application-specific integrated circuit 802 with a time/phase delay of N+1, whereas a third drive mode transducer can be driven by the application-specific integrated circuit 802 with a time/phase delay of N+2 and so on. It may be appreciated that the application-specific integrated circuit 802 can apply any suitable delay to any suitable drive signal applied to any drive mode transducers of the set of drive-mode transducers selected form the array of acoustic transducers 804.

The acoustic imaging system 800 also includes an adhesive layer 806 that acoustically and mechanically couples the array of acoustic transducers 804 to a first surface of an acoustic medium 806a, which has a curved profile. A curved profile is not required of all embodiments; some examples include acoustic media of different cross-sectional profiles.

As a result of this construction, as with other embodiments described herein, once the application-specific integrated circuit 802 applies an appropriate voltage signal to a given acoustic transducer of the array of acoustic transducers 804, that given acoustic transducer generates a corresponding mechanical wave that can propagate through the adhesive layer 806 into the acoustic medium 806a, traversing a thickness of the acoustic medium 806a until that mechanical wave reaches a surface of the acoustic medium 806a that is generally opposite the first surface of the acoustic medium 806a, after which at least a portion of the energy of the mechanical wave is reflected from that second surface (the imaging surface). The reflected wave traverses the acoustic medium 806a again and may be received at least one sense-mode transducer.

As noted above, the depicted embodiment illustrates a linear scan drive operation that leverages beamforming to focus acoustic energy emitted from multiple acoustic transducers at a selected location of a curved imaging surface. More particularly, the application-specific integrated circuit 802 can be configured to select a scan plan that linearly advances from one fractional area of the imaging surface to another fractional area of the imaging surface. In this manner, the application-specific integrated circuit 802 rasterizes an image of an object engaging the imaging surface, such as a fingerprint of a user 808.

More specifically, in these examples, the application-specific integrated circuit 802 can be configured to (1) select a fractional area 810a of the imaging surface, (2) select a scan plan and/or beamforming operation that targets the fractional area 810a, and (3) execute that scan plan, such as shown in FIGS. 8A-8C.

In particular, as shown in FIG. 8A, a set of drive mode transducers and a set of sense mode transducers are selected from the array of acoustic transducers 804. In this embodiment, drive-mode transducers bookend (and/or circumscribe in a two-dimensional drive embodiment) the sense-mode transducers, but this is not required of all embodiments. For reference and example, a sense mode transducer 812a is identified and bookended by drive-mode transducers 814a and 816a. Although only a single sense mode transducer is labeled, it may be appreciated that more than one transducer can be operated in a sense mode. Similarly, although only two drive-mode transducers are labeled, it may be appreciated that more than two transducers can be operated in a drive mode.

FIG. 8A depicts the drive-mode transducers 814a and 816a emitting acoustic energy (alongside, and timed with respect to adjacent and/or other drive-mode transducers) with specific timing such that a signal emitted from the drive-mode transducer 814a arrives at the selected fractional area of the imaging surface, the fractional area 810a, at the same time that a signal emitted from the drive-mode transducer 816a arrives. As a result of this construction, reflections from these two signals may constructively interfere toward the direction of the sense-mode transducer 812a, thereby increasing a signal-to-noise ratio associated with operated and/or receiving signals from the sense-mode transducer 812a.

FIG. 8B depicts the scan plan of FIG. 8A advanced by a step. In particular, FIG. 8B depicts the drive-mode transducers 814b and 816b emitting acoustic energy (alongside, and timed with respect to adjacent and/or other drive-mode transducers) with specific timing such that a signal emitted from the drive-mode transducer 814b arrives at a different selected fractional area of the imaging surface, the fractional area 810b, at the same time that a signal emitted from the drive-mode transducer 816b arrives. As described above in reference to FIG. 8A, as a result of this construction, reflections from these two signals may constructively interfere toward the direction of a sense-mode transducer 812b, thereby increasing a signal-to-noise ratio associated with operated and/or receiving signals from the sense-mode transducer 812*b*. In this example, timings associated with driving and/or sensing by the application-specific integrated circuit 802 may be varied with respect to the operation shown in FIG. 8A due to curvature of the acoustic medium 806*a*.

FIG. 8C depicts the scan plan of FIGS. 8A-8B advanced by another step. In particular, FIG. 8C depicts the drive-mode transducers 814*c* and 816*c* emitting acoustic energy (alongside, and timed with respect to adjacent and/or other drive-mode transducers) with specific timing such that a signal emitted from the drive-mode transducer 814*c* arrives at a different selected fractional area of the imaging surface, the fractional area 810*c*, at the same time that a signal emitted from the drive-mode transducer 816*b* arrives. As described above in reference to FIGS. 8A-8B, as a result of this construction, reflections from these two signals may constructively interfere toward the direction of a sense-mode transducer 812*c*, thereby increasing a signal-to-noise ratio associated with operated and/or receiving signals from the sense-mode transducer 812*c*. In this example, timings associated with driving and/or sensing by the application-specific integrated circuit 802 may be varied with respect to the operation shown in FIG. 8A due to curvature of the acoustic medium 806*a*.

The foregoing embodiments depicted in FIGS. 8A-8C and the various alternatives thereof and variations thereto are presented, generally, for purposes of explanation, and to facilitate an understanding of various operations of an acoustic imaging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 9A:
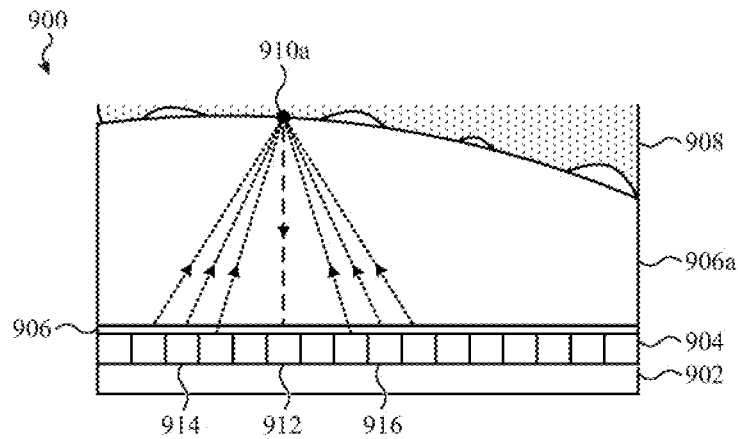
FIGS. 9A-9B depict a simplified cross-section of an acoustic imaging system as described herein, implementing a depth-averaging scan drive operation that leverages beamforming to focus acoustic energy emitted from multiple acoustic transducers at a selected location to a selected depth, of a curved imaging surface.
Figure 9B:
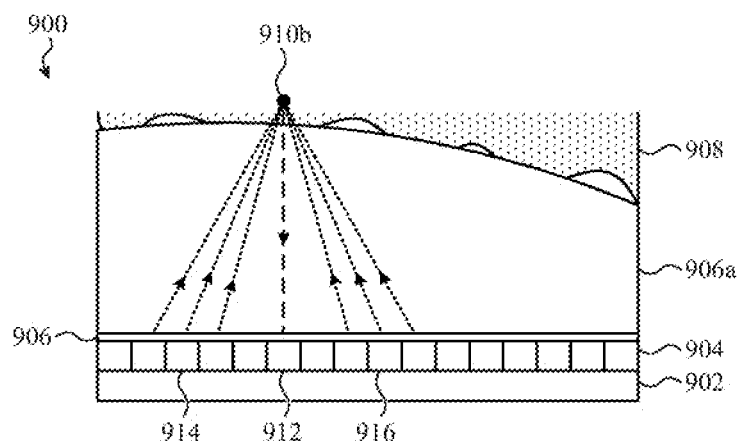

For example, a linear scan plan that follows a contour of an acoustic medium may not be suitable or preferred in all embodiments. For example, FIGS. 9A-9B depict a simplified cross-section of an acoustic imaging system as described herein, implementing a depth-averaging scan drive operation that leverages beamforming to focus acoustic energy emitted from multiple acoustic transducers at a selected location to a selected depth, of a curved imaging surface.

As with the embodiment shown in FIG. 8A, in the illustrated embodiment, an acoustic imaging system 900 is shown. The acoustic imaging system 900 includes an application-specific integrated circuit 902 that may be communicably, conductively, and/or mechanically coupled to an array of acoustic transducers 904. As with other embodiments describe herein, the application-specific integrated circuit 902 of the acoustic imaging system 900 can be configured to perform or coordinate one or more drive or sense operations of the acoustic imaging system 900. The application-specific integrated circuit 902 may be configured in a similar or identical manner to the application-specific integrated circuit 802 shown in FIG. 8A; this description is not repeated.

As with other embodiments, the acoustic imaging system 900 can optionally include an adhesive layer 906 that acoustically and mechanically couples the array of acoustic transducers 904 to a first surface of an acoustic medium 906*a*, which has a curved profile. A curved profile is not required of all embodiments; some examples include acoustic media of different cross-sectional profiles.

As a result of this construction, as with other embodiments described herein, once the application-specific integrated circuit 902 applies an appropriate voltage signal to a given acoustic transducer of the array of acoustic transducers 904, that given acoustic transducer generates a corresponding mechanical wave that can propagate through the adhesive layer 906 into the acoustic medium 906*a*, traversing a thickness of the acoustic medium 906*a* until that mechanical wave reaches a surface of the acoustic medium 906*a* that is generally opposite the first surface of the acoustic medium 906*a*, after which at least a portion of the energy of the mechanical wave is reflected from that second surface (the imaging surface). The reflected wave traverses the acoustic medium 906*a* again and may be received at least one sense-mode transducer.

As noted above, the depicted embodiment illustrates a depth-averaging linear scan drive operation that leverages beamforming to focus acoustic energy emitted from multiple acoustic transducers at a selected location of a curved imaging surface, focused to a particular depth. More particularly, the application-specific integrated circuit 902 can be configured to select a scan plan that advances from one fractional area of the imaging surface to another fractional area of the imaging surface only after capturing information at different and/or varying depths at each (or a selected number of) fractional area of the imaging surface. In this manner, the application-specific integrated circuit 902 rasterizes an image of an object engaging the imaging surface, such as a fingerprint of a user 908.

More specifically, in these examples, the application-specific integrated circuit 902 can be configured to (1) select a fractional area 910*a* of the imaging surface, (2) select a scan plan and/or beamforming operation that targets the fractional area 910*a*, and (3) execute that scan plan, such as shown in FIGS. 9A-9B.

In particular, as shown in FIG. 9A, a set of drive mode transducers and a set of sense mode transducers are selected from the array of acoustic transducers 904. In this embodiment, drive-mode transducers bookend (and/or circumscribe in a two-dimensional drive embodiment) the sense-mode transducers, but this is not required of all embodiments. For reference and example, a sense mode transducer 912 is identified and bookended by drive-mode transducers 914 and 916. As with other embodiments described herein, although only a single sense mode transducer is labeled, it may be appreciated that more than one transducer can be operated in a sense mode. Similarly, although only two drive-mode transducers are labeled, it may be appreciated that more than two transducers can be operated in a drive mode.

FIG. 9A depicts the drive-mode transducers 914 and 916 emitting acoustic energy (alongside, and timed with respect to adjacent and/or other drive-mode transducers) with specific timing such that a signal emitted from the drive-mode transducer 914 arrives at the selected fractional area of the imaging surface, the fractional area 910*a*, at the same time that a signal emitted from the drive-mode transducer 916 arrives. As a result of this construction, reflections from these two signals may constructively interfere toward the direction of the sense-mode transducer 912, thereby increasing a signal-to-noise ratio associated with operated and/or receiving signals from the sense-mode transducer 912.

FIG. 9B depicts the scan plan of FIG. 9A advanced by a step. In particular, FIG. 9B depicts the drive-mode transducers 914 and 916 emitting acoustic energy (alongside, and timed with respect to adjacent and/or other drive-mode transducers) with specific timing such that a signal emitted from the drive-mode transducer 914 arrives at the same selected fractional area of the imaging surface, but focused at a depth beyond an interface between the acoustic medium 906*a* and the user's finger 908. This focal point, identified as the fractional area 910*b*, at the same time that a signal emitted from the drive-mode transducer 916 arrives. As described above in reference to FIG. 9A, as a result of this construction, reflections from these two signals may constructively interfere toward the direction of a sense-mode transducer 912, thereby increasing a signal-to-noise ratio associated with operated and/or receiving signals from the sense-mode transducer 912. In this example, as with other embodiments described herein, timings associated with driving and/or sensing by the application-specific integrated circuit 902 may be varied with respect to the operation shown in FIG. 9A due to curvature of the acoustic medium 906*a*.

In these examples, different samples taken at different depths may be averaged and/or otherwise combined to output a single result for a given fractional area of the input surface.

Figure 10A:
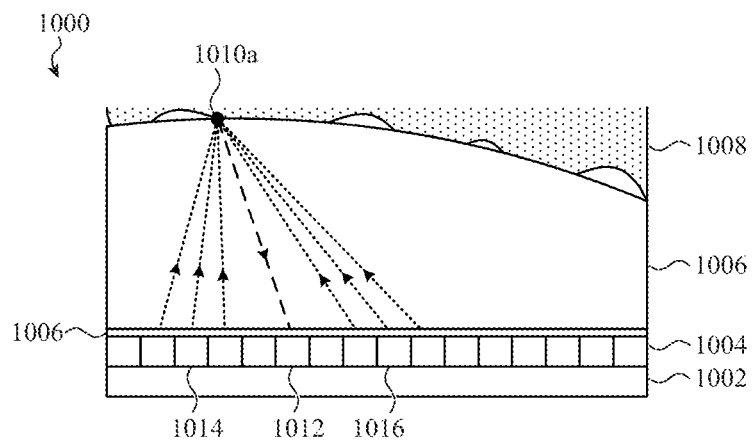
FIGS. 10A-10C depict a simplified cross-section of an acoustic imaging system as described herein, implementing a sweep scan drive operation that leverages beamforming to focus acoustic energy emitted from multiple acoustic transducers at a set of selected locations of a curved imaging surface.
Figure 10B:
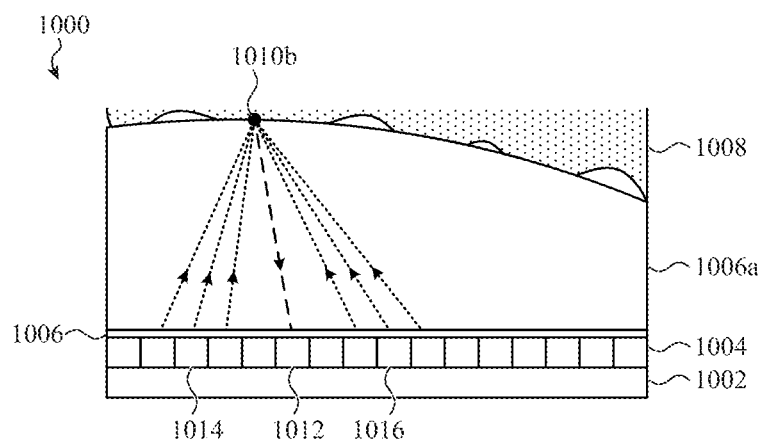
Figure 10C:
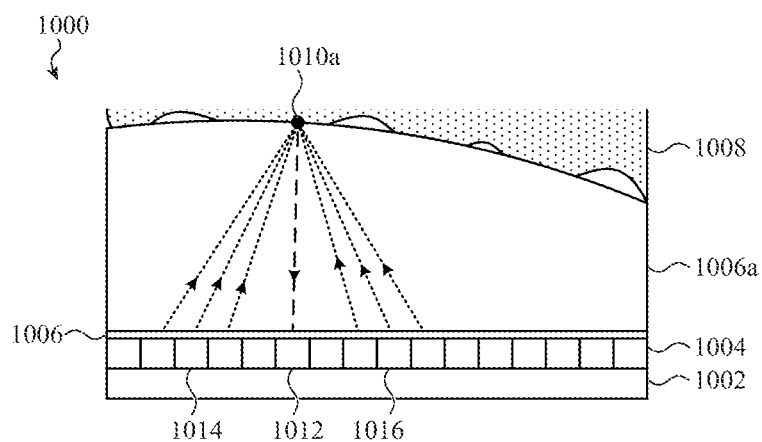

As described above, linear scan operations, whether those operations are performed with or without depth-averaging, are not the only beamforming operations that can be associated with a scan plan such as described herein. For example, FIGS. 10A-10C depict a simplified cross-section of an acoustic imaging system as described herein, implementing a sweep scan drive operation that leverages beamforming to focus acoustic energy emitted from multiple acoustic transducers at a set of selected locations of a curved imaging surface.

In the illustrated embodiment, an acoustic imaging system 1000 is shown. The acoustic imaging system 1000 includes an application-specific integrated circuit 1002 that may be communicably, conductively, and/or mechanically coupled to an array of acoustic transducers 1004. As with other embodiments describe herein, the application-specific integrated circuit 1002 of the acoustic imaging system 1000 can be configured to perform or coordinate one or more drive or sense operations of the acoustic imaging system 1000. The application-specific integrated circuit 1002 can be configured and operated as described above with reference to other embodiments; this description is not repeated.

The acoustic imaging system 1000 also includes an adhesive layer 1006 that acoustically and mechanically couples the array of acoustic transducers 1004 to a first surface of an acoustic medium 1006*a*, which has a curved profile. As with other embodiments described herein, a curved profile is not required of all embodiments; some examples include acoustic media of different cross-sectional profiles.

As a result of this construction, as with other embodiments described herein, once the application-specific integrated circuit 1002 applies an appropriate voltage signal to a given acoustic transducer of the array of acoustic transducers 1004, that given acoustic transducer generates a corresponding mechanical wave that can propagate through the adhesive layer 1006 into the acoustic medium 1006*a*, traversing a thickness of the acoustic medium 1006*a* until that mechanical wave reaches a surface of the acoustic medium 1006*a* that is generally opposite the first surface of the acoustic medium 1006*a*, after which at least a portion of the energy of the mechanical wave is reflected from that second surface (the imaging surface). The reflected wave traverses the acoustic medium 1006*a* again and may be received at least one sense-mode transducer.

As noted above, the depicted embodiment illustrates a sweep scan drive operation that leverages beamforming to focus acoustic energy emitted from multiple acoustic transducers at a selected location of a curved imaging surface. Thereafter, the same set of drive-mode transducers and/or the same set of sense-mode transducers can be used with different timings and/or delay coefficients to image a different fractional section. In this manner, a beam formed by timing output from one or more drive-mode transcoders can be "swept" across the imaging surface. In these examples, as may be appreciated by a person of skill in the art, higher resolution over the embodiment shown in FIGS. 8A-8C may be obtained, as effectively continuous measurements may be taken across the imaging surface.

More particularly, the application-specific integrated circuit 1002 can be configured to select a scan plan that linearly advances from one fractional area of the imaging surface to another fractional area of the imaging surface merely by modifying timing of the same set of drive-mode transducers and sense-mode transducers. In this manner, the application-specific integrated circuit 1002 rasterizes an image of an object engaging the imaging surface, such as a fingerprint of a user 1008.

More specifically, in these examples, the application-specific integrated circuit 1002 can be configured to (1) select a fractional area 1010*a* of the imaging surface, (2) select a scan plan and/or beamforming operation and/or set of delay coefficients associated therewith that targets the fractional area 1010*a*, and (3) execute that scan plan, such as shown in FIGS. 10A-10C.

In particular, as shown in FIG. 10A, a set of drive mode transducers and a set of sense mode transducers are selected from the array of acoustic transducers 1004. In this embodiment, drive-mode transducers bookend (and/or circumscribe in a two-dimensional drive embodiment) the sense-mode transducers, but this is not required of all embodiments. For reference and example, a sense mode transducer 1012 is identified and bookended by drive-mode transducers 1014 and 1016. Although only a single sense mode transducer is labeled, as with previous embodiments, it may be appreciated that more than one transducer can be operated in a sense mode. Similarly, although only two drive-mode transducers are labeled, it may be appreciated that more than two transducers can be operated in a drive mode.

FIG. 10A depicts the drive-mode transducers 1014 and 1016 emitting acoustic energy (alongside, and timed with respect to adjacent and/or other drive-mode transducers) with specific timing such that a signal emitted from the drive-mode transducer 1014 arrives at the selected fractional area of the imaging surface, the fractional area 1010*a*, at the same time that a signal emitted from the drive-mode transducer 1016 arrives. As a result of this construction, reflections from these multiple signals may constructively interfere toward the direction of the sense-mode transducer 1012, thereby increasing a signal-to-noise ratio associated with operated and/or receiving signals from the sense-mode transducer 1012.

FIG. 10B depicts the scan plan of FIG. 10A advanced by a step. In particular, FIG. 10B depicts the drive-mode transducers 1014 and 1016 emitting acoustic energy (alongside, and timed with respect to adjacent and/or other drive-mode transducers) with specific timing such that a signal emitted from the drive-mode transducer 1014 arrives at a different selected fractional area of the imaging surface, the fractional area 1010b, at the same time that a signal emitted from the drive-mode transducer 1016 arrives. As described above in reference to FIG. 10A, as a result of this construction, reflections from these signals may constructively interfere toward the direction of a sense-mode transducer 1012, thereby increasing a signal-to-noise ratio associated with operated and/or receiving signals from the sense-mode transducer 1012. In this example, timings associated with driving and/or sensing by the application-specific integrated circuit 1002 may be varied with respect to the operation shown in FIG. 10A due to curvature of the acoustic medium 1006a.

FIG. 10C depicts the scan plan of FIGS. 10A-10B advanced by yet another step. In particular, FIG. 10C depicts the drive-mode transducers 1014 and 1016 emitting acoustic energy (alongside, and timed with respect to, adjacent and/or other drive-mode transducers) with specific timing such that a signal emitted from the drive-mode transducer 1014 arrives at a different selected fractional area of the imaging surface, the fractional area 1010c, at the same time that a signal emitted from the drive-mode transducer 1016 arrives. As described above in reference to FIGS. 10A-10B, as a result of this construction, reflections from these two signals may constructively interfere toward the direction of a sense-mode transducer 1012, thereby increasing a signal-to-noise ratio associated with operated and/or receiving signals from the sense-mode transducer 1012. In this example, timings associated with driving and/or sensing by the application-specific integrated circuit 1002 may be varied with respect to the operation shown in FIG. 10A due to curvature of the acoustic medium 1006a.

The foregoing embodiments depicted in FIGS. 10A-10C and the various alternatives thereof and variations thereto are presented, generally, for purposes of explanation, and to facilitate an understanding of various operations of an acoustic imaging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 11A:
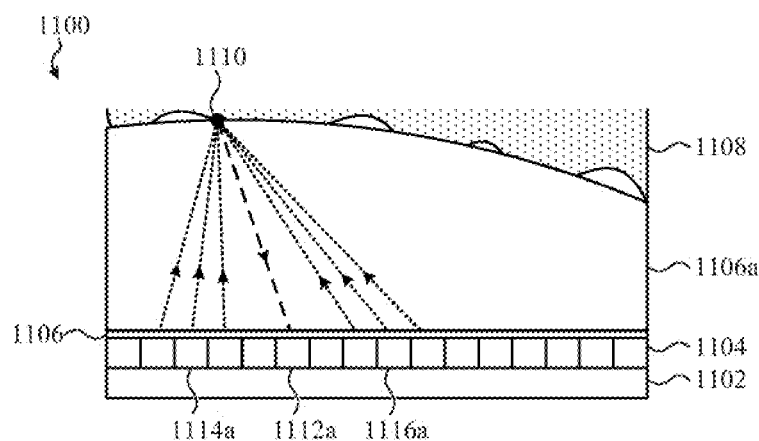
FIGS. 11A-11C depict a simplified cross-section of an acoustic imaging system as described herein, implementing an inverse sweep scan drive operation that leverages beamforming to focus acoustic energy emitted from multiple acoustic transducers at a selected location of a curved imaging surface.
Figure 11B:
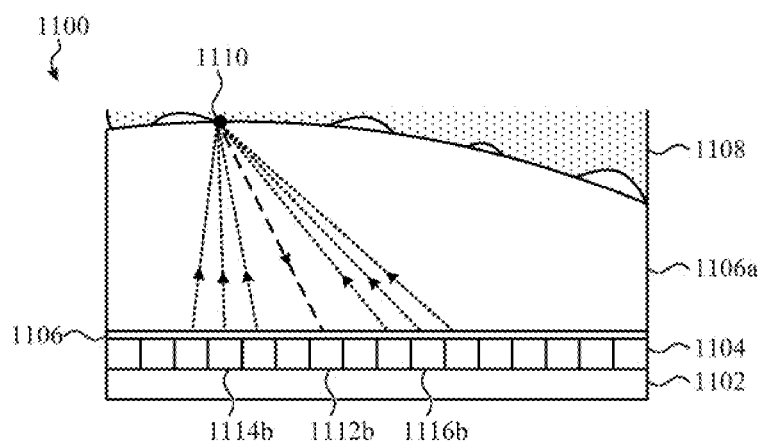
Figure 11C:
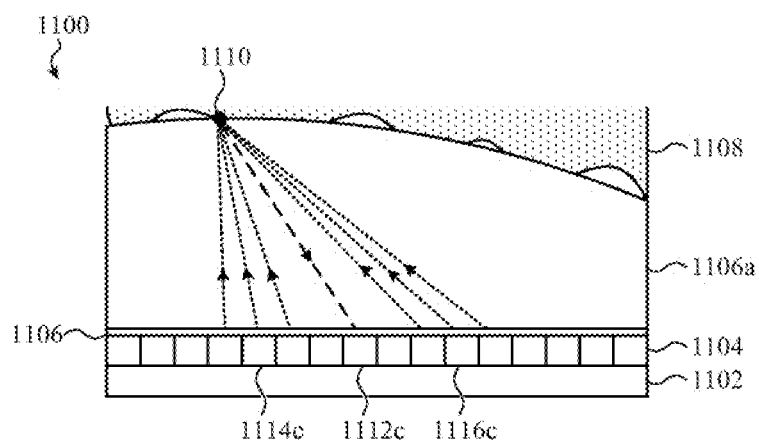

For example, FIGS. 11A-11C depict a simplified cross-section of an acoustic imaging system as described herein, implementing an inverse sweep scan drive operation that leverages beamforming to focus acoustic energy emitted from multiple acoustic transducers at a selected location of a curved imaging surface. In this example embodiment, a sweep operation such as described above with reference to FIGS. 10A-10C can be performed in inverse; instead of sweeping which fractional area of the input surface is targeted with a subsequent beamforming operations, in FIGS. 11A-11C, a selected fractional area can remain the same, while different sets of drive-mode and sense-mode transducers are selected for each subsequent step of the scan plan.

More particularly, in the illustrated embodiment, an acoustic imaging system 1100 is shown. As with other embodiments, the acoustic imaging system 1100 includes an application-specific integrated circuit 1102 that may be communicably, conductively, and/or mechanically coupled to an array of acoustic transducers 1104. As with other embodiments described herein, the application-specific integrated circuit 1102 of the acoustic imaging system 1100 can be configured to perform or coordinate one or more drive or sense operations of the acoustic imaging system 1100. The application-specific integrated circuit 1102 can be configured and operated as described above with reference to other embodiments; this description is not repeated.

The acoustic imaging system 1100 also includes an adhesive layer 1106 that acoustically and mechanically couples the array of acoustic transducers 1104 to a first surface of an acoustic medium 1106a, which has a curved profile. As with other embodiments described herein, a curved profile is not required of all embodiments; some examples include acoustic media of different cross-sectional profiles.

As noted above, the depicted embodiment illustrates an inverse sweep scan drive operation that leverages beamforming to focus acoustic energy emitted from multiple acoustic transducers at a selected location of a curved imaging surface. Thereafter, a different set of drive-mode transducers and/or a different set of sense-mode transducers can be used with different timings and/or delay coefficients to image the same fractional section. In this manner, a beam formed by timing output from one or more drive-mode transcoders can be "swept" across the array of acoustic transducers. In these examples, as may be appreciated by a person of skill in the art, higher resolution over the embodiment shown in FIGS. 8A-8C may be obtained, as effectively continuous measurements may be taken across the imaging surface.

More particularly, the application-specific integrated circuit 1102 can be configured to select a scan plan that images the same one fractional area of the imaging surface in multiple ways and/or from multiple angles (e.g., three-dimensional sensing in some configurations) by modifying the set of drive-mode transducers and sense-mode transducers. In this manner, the application-specific integrated circuit 1102 rasterizes an image of an object engaging the imaging surface, such as a fingerprint of a user 1108.

More specifically, in these examples, the application-specific integrated circuit 1102 can be configured to (1) select a fractional area 1110 of the imaging surface, (2) select a scan plan and/or beamforming operation and/or set of delay coefficients associated therewith that targets the fractional area 1110, and (3) execute that scan plan, such as shown in FIGS. 11A-11C.

In particular, as shown in FIG. 11A, a set of drive mode transducers and a set of sense mode transducers are selected from the array of acoustic transducers 1104. In this embodiment, drive-mode transducers bookend (and/or circumscribe in a two-dimensional drive embodiment) the sense-mode transducers, but this is not required of all embodiments. For reference and example, a sense mode transducer 1112a is identified and bookended by drive-mode transducers 1114a and 1116a. Although only a single sense mode transducer is labeled, as with previous embodiments, it may be appreciated that more than one transducer can be operated in a sense mode. Similarly, although only two drive-mode transducers are labeled, it may be appreciated that more than two transducers can be operated in a drive mode.

FIG. 11A depicts the drive-mode transducers 1114a and 1116a emitting acoustic energy (alongside, and timed with respect to adjacent and/or other drive-mode transducers) with specific timing such that a signal emitted from the drive-mode transducer 1114a arrives at the selected fractional area of the imaging surface, the fractional area 1110, at the same time that a signal emitted from the drive-mode transducer 1116*a* arrives. As a result of this construction, reflections from these multiple signals may constructively interfere toward the direction of the sense-mode transducer 1112*a*, thereby increasing a signal-to-noise ratio associated with operated and/or receiving signals from the sense-mode transducer 1112*a*.

FIG. 11B depicts the scan plan of FIG. 11A advanced by a step. In particular, FIG. 11B depicts the drive-mode transducers 1114*b* and 1116*b* emitting acoustic energy (alongside, and timed with respect to adjacent and/or other drive-mode transducers) with specific timing such that a signal emitted from the drive-mode transducer 1114*b* arrives at the fractional area 1110 at the same time that a signal emitted from the drive-mode transducer 1116*b* arrives. As described above in reference to FIG. 11A, as a result of this construction, reflections from these signals may constructively interfere toward the direction of a sense-mode transducer 1112*b*, thereby increasing a signal-to-noise ratio associated with operated and/or receiving signals from the sense-mode transducer 1112*b*. In this example, timings associated with driving and/or sensing by the application-specific integrated circuit 1102 may be varied with respect to the operation shown in FIG. 11A due to curvature of the acoustic medium 1106*a*.

FIG. 11C depicts the scan plan of FIGS. 11A-11B advanced by yet another step. In particular, FIG. 11C depicts the drive-mode transducers 1114*c* and 1116*c* emitting acoustic energy (alongside, and timed with respect to, adjacent and/or other drive-mode transducers) with specific timing such that a signal emitted from the drive-mode transducer 1114*c* arrives at a the same fractional area of the imaging surface, the fractional area 1110, at the same time that a signal emitted from the drive-mode transducer 1116*c* arrives. As described above in reference to FIGS. 11A-11B, as a result of this construction, reflections from these two signals may constructively interfere toward the direction of a sense-mode transducer 1112*c*, thereby increasing a signal-to-noise ratio associated with operated and/or receiving signals from the sense-mode transducer 1112*c*. In this example, timings associated with driving and/or sensing by the application-specific integrated circuit 1102 may be varied with respect to the operation shown in FIG. 11A due to curvature of the acoustic medium 1106*a*.

The foregoing embodiments depicted in FIGS. 11A-11C and the various alternatives thereof and variations thereto are presented, generally, for purposes of explanation, and to facilitate an understanding of various operations of an acoustic imaging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, although the embodiments shown and described in reference to FIGS. 8A-11C are shown in cross-section, it may be appreciated that any beamforming operation as described herein can be performed with drive-mode transducers arranged in a two-dimensional array.

In such examples, it may be preferred in some embodiments to optimize beamforming timings based not on, or not exclusively on, arrival time of acoustic pulses at an imaging surface or, in particular, a fractional area of the imaging surface, but rather it may be preferred to optimize beamforming operations to minimize carrier noise received at sense-mode transducers after the acoustic signals emitted from drive-mode transducers has reflected from the surface of the acoustic medium (e.g., reflected from the imaging surface).

It may be appreciated that such optimizations depend on a number of factors including an arrangement of drive-mode transducers for a particular embodiment (and/or selected for a particular beamforming operation), a location of the targeted fractional area of the input surface, a location of one or more sense-mode transducers, and so on. As a result, optimization may be, in some cases, an implementation-specific operation.

Figure 12:
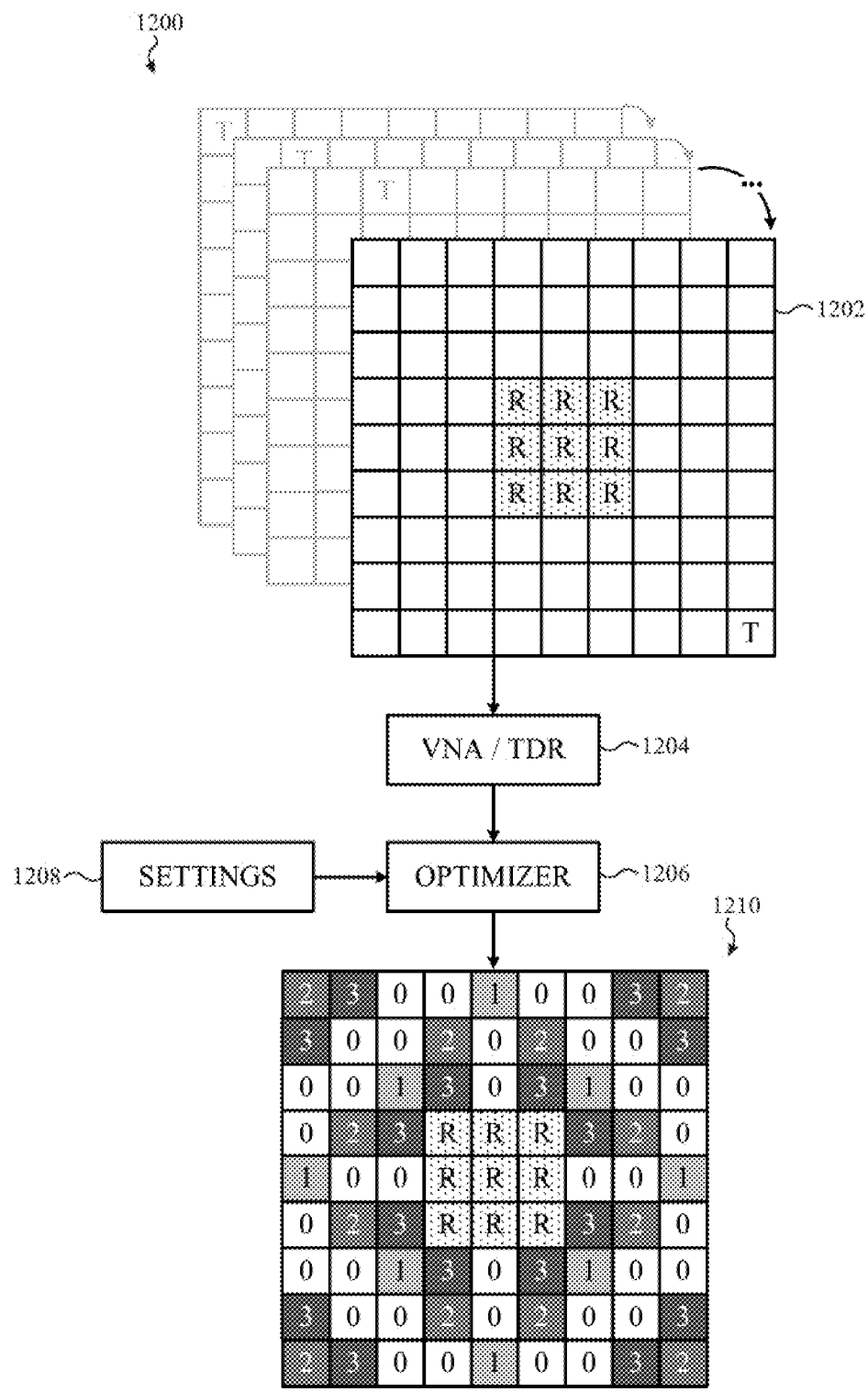
FIG. 12 depicts a system/signal flow diagram of a system for optimizing delay coefficients of a drive mode of an acoustic imaging system as described herein.

FIG. 12 depicts a system/signal flow diagram of a system for optimizing delay coefficients of a drive mode of an acoustic imaging system as described herein. The figure corresponds, generally, to an example method of optimizing output from a given set of drive-mode transducers to reduce carrier noise at a sense-mode transducer. In another non-limiting phrasing, the method associated with the system/signal flow diagram of FIG. 12 may optimize for destructive interference at or before one or more particularly-located sense-mode transducers.

In this example, a calibration operation 1200 can be performed in which a given array of transducers 1202 is selected and from the array a set of sense-mode transducers are selected. In this example, the sense-mode transducers are generally in the center of the array of transducers 1202, but it may be appreciated that this is merely one example construction and that other scan plans and/or other beam-forming operations may optimize differently.

In this example, the calibration operation 1200 stimulates each drive-mode transducer of the array individually, cycling through all drive-mode transducers one at a time. Signals received from the sense-mode transducers can be provided as input to a vector network analyzer and/or a time domain reflectometer 1204. Either apparatus may be leveraged to characterize timing and/or frequency-domain content of the signals received by the sense-mode transducers for each drive operation of each drive-mode transducer.

Thereafter output from the vector network analyzer and/or a time domain reflectometer 1204 can be provided as input to an optimizer 1206 that, in accordance with one or more settings defined by or in a memory 1208, can optimize delays for each signal associated with each drive-mode transducer to minimize carrier output at the sense-mode transducers. One example optimization array including delay coefficients for each drive-mode transducer is shown as the example delay coefficient array 1210.

The foregoing embodiments depicted in FIG. 12 and the various alternatives thereof and variations thereto are presented, generally, for purposes of explanation, and to facilitate an understanding of various operations of an acoustic imaging system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 13:
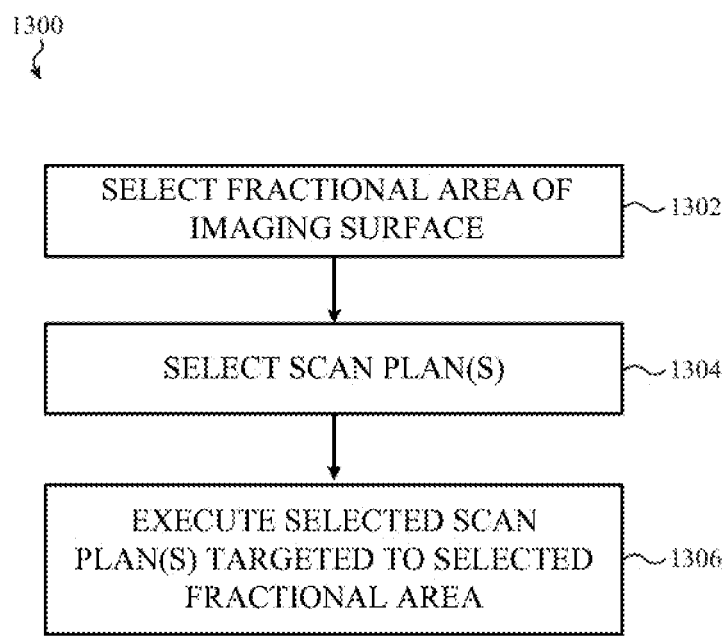
FIG. 13 is a flowchart depicting example operations of a method of operating a thin-film acoustic imaging system, such as described herein.

FIG. 13 is a flowchart depicting example operations of a method of operating a thin-film acoustic imaging system, such as described herein. The method 1300 includes operation 1302 at which a fractional area of an imaging surface is selected. Next at operation 1304 a scan plan suitable for the fractional area and/or surrounding/adjacent areas is selected. Finally at operation 1306, the scan plan can be executed and one or more beamforming operations can be performed.

Figure 14:
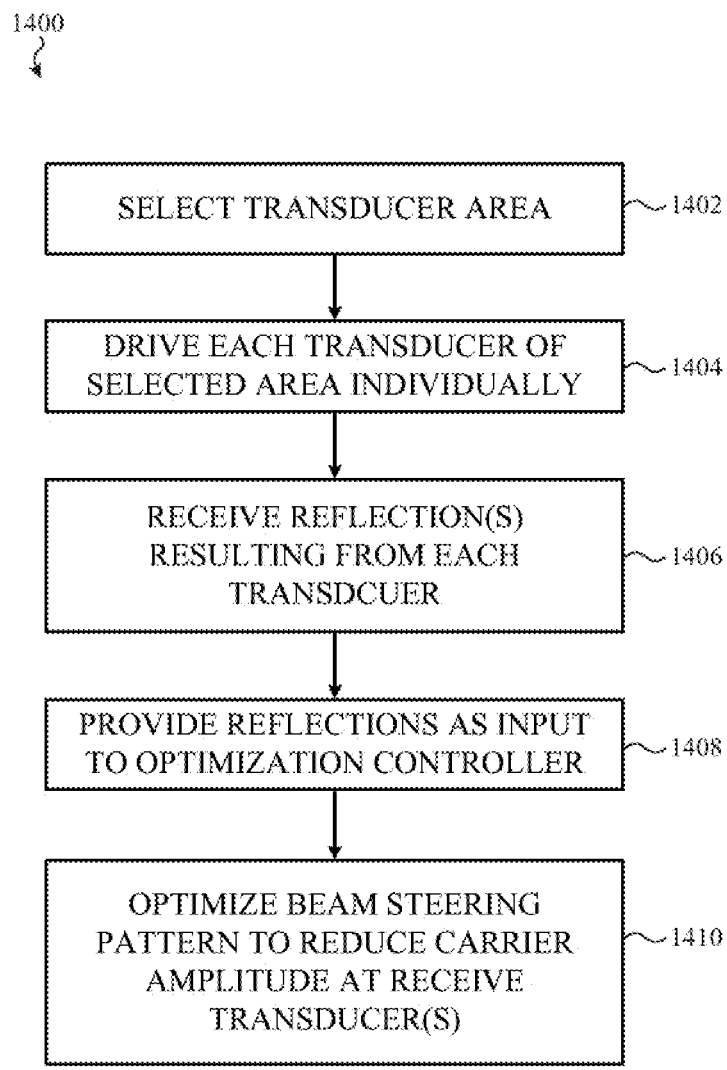
FIG. 14 is a flowchart depicted example operations of a method of operating a thin-film acoustic imaging system, such as described herein.

FIG. 14 is a flowchart depicted example operations of a method of operating a thin-film acoustic imaging system, such as described herein. The method 1400 includes operation 1404 at which a set of transducers defining an area is selected. At operation 1404, each of the transducers can be driven individually. At operation 1406, reflections resulting from those drive operations can be received at sense-mode transducers. At operation 1408, reflections received at operation 1406 can be received as input to an optimization controller. Finally, at operation 1410, beamsteering and/or beamforming operations can be optimized to reduce carrier amplitude at sense-mode transducers.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of embodiments, whether or not such embodiments are described and whether or not such features are presented as being a part of a described embodiment. Thus, the breadth and scope of the claimed subject matter should not be limited by any of the above-described exemplary embodiments but is instead defined by the claims herein presented.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

What is claimed is:

1. An electronic device comprising:
   a housing; and
   an acoustic imaging system coupled to the housing, defining an imaging surface on an exterior surface of the housing, and comprising:
      an array of thin-film acoustic transducers each operable in a drive mode and a sense mode;
      a scan planner coupled to the array and configured to:
         select a fractional area of the imaging surface;
         select a scan plan comprising:
            a first set of thin-film acoustic transducers selected from the array of thin-film acoustic transducers and operated in drive mode;
            a second set of thin-film acoustic transducers selected from the array of thin-film acoustic transducers and operated in sense mode; and
            a set of delay coefficients, each coefficient defining a delay after which a corresponding one thin-film acoustic transducer of the first set of thin-film acoustic transducers generates a drive signal; and
         execute the selected scan plan to cause each thin-film acoustic transducers of the first set of thin-film acoustic transducers to generate a respective one drive signal delayed according to a respective one coefficient of the set of delay coefficients;
      an analog to digital converter stage configured to receive at least one electrical signal from the second set of thin-film acoustic transducers and to output a digital value corresponding to acoustic impedance mismatch at the fractional area; and
      an image processor configured to:
         receive as input the digital value from the analog to digital converter; and
         provide as output an image of an object engaging the imaging surface, the image comprising a pixel based at least in part on the digital value.

2. The electronic device of claim 1, wherein the exterior surface of the housing has a curved profile.

3. The electronic device of claim 2, wherein the scan plan is selected, at least in part, based on the curved profile.

4. The electronic device of claim 3, wherein the set of delay coefficients is based at least in part on the curved profile of the housing.

5. The electronic device of claim 1, wherein the electronic device is a wearable electronic device and the acoustic imaging system is coupled to a sidewall of the housing.

6. The electronic device of claim 1, wherein the first set is disjoint with the second set.

7. The electronic device of claim 1, wherein the scan plan is selected from a set of scan plans.

8. The electronic device of claim 1, wherein the set of delay coefficients is optimized to reduce carrier noise at the second set of thin-film acoustic transducers.

9. The electronic device of claim 1, wherein the housing is formed from metal and has a curved profile such that the imaging surface is curved, contouring to the curved profile.

10. The electronic device of claim 9, wherein the metal is titanium or stainless steel.

11. An acoustic imaging system for biometric imaging through a housing of a portable electronic device, the acoustic imaging system comprising:
    an array of thin-film acoustic transducers acoustically coupled to an interior sidewall surface of the housing, thereby defining an imaging surface along an exterior surface of the housing;
    a scan planner coupled to the array and configured to execute a scan plan defining a relative drive mode delay between at least two thin-film acoustic transducers of the array to direct acoustic energy to a selected fractional area of the imaging surface;
    an analog to digital converter stage configured to receive at least one electrical signal from at last one thin-film acoustic transducer of the array of thin-film acoustic transducers and to output a digital value corresponding to an acoustic impedance mismatch at the selected fractional area; and
    an image processor configured to provide as output an image of an object engaging the imaging surface, the image comprising a pixel based at least in part on the digital value.

12. The acoustic imaging system of claim 11, wherein the image comprises a fingerprint image.

13. The acoustic imaging system of claim 11, wherein the exterior surface and the imaging surface are at least partially curved.

14. The acoustic imaging system of claim 11, wherein at least one thin-film acoustic transducer of the array of thin-film acoustic transducers is formed from PVDF.

15. The acoustic imaging system of claim 11, wherein the imaging surface is defined at least partially through one of a button or a rotary input device.

16. A method of executing a scan plan for an imaging area defined by an acoustic imaging system coupled to a housing of an electronic device, the method comprising:
    selecting, from an array of acoustic transducers operable in a drive mode and a sense mode, a first set of acoustic transducers to operate in the drive mode;
    selecting, from the array of acoustic transducers, a second set of acoustic transducers to operate in the sense mode;
    selecting a scan plan; and
    providing, as output, an image of an object engaging the imaging surface, the image comprising at least one pixel based on at least one digital value generated by iteratively selecting a target fractional area of the imaging area and:
        driving the first set of acoustic transducers according to a set of delay coefficients defined by the scan plan and based on the target fractional area;
        receiving, from the second set of acoustic transducers, at least one electrical signal to be converted to a digital value corresponding to acoustic impedance at the target fractional area of the imaging area; and
        selecting a next target fractional area as the target fractional area.

17. The method of claim 16, wherein the first set of acoustic transducers circumscribes the second set of acoustic transducers.

18. The method of claim 16, wherein at least one acoustic transducer of the array of acoustic transducers comprises a thin-film piezoelectric actuator.

19. The method of claim 16, wherein the housing is formed from metal and has a curved profile.

20. The method of claim 16, wherein the first set of acoustic transducers defines a contiguous area of acoustic transducers.

* * * * *

UNITED STATES PATENT AND TRADEMARK OFFICE
CERTIFICATE OF CORRECTION

PATENT NO. : 11,573,665 B2
APPLICATION NO. : 17/709251
DATED : February 7, 2023
INVENTOR(S) : Marcus C. Yip et al.

Page 1 of 1

It is certified that error appears in the above-identified patent and that said Letters Patent is hereby corrected as shown below:

In the Drawings

Sheet 9, Fig. 4, the uppermost reference numeral "414"
Should read as --424--

In the Specification

Column 8, Line 37, "opposite surface surface as an "imaging surface." For"
Should read as --opposite surface as an "imaging surface." For--

Column 27, Line 60, "Thereafter, reflections from an upper surface 414, some of"
Should read as --Thereafter, reflections from an upper surface 424, some of--

Column 28, Line 1, "µm, the second electrode 412 has a thickness of approxi-"
Should read as --µm, the second electrode 408 has a thickness of approxi- --

In the Claims

Column 50, Line 19, Claim 16, "providing, as output, an image of an object engaging the"
Should read as --providing, as output, an image of an object engaging an--

Signed and Sealed this
Eleventh Day of July, 2023

Katherine Kelly Vidal
*Director of the United States Patent and Trademark Office*